(12) United States Patent
Bhattacharjee et al.

(10) Patent No.: US 11,111,164 B2
(45) Date of Patent: Sep. 7, 2021

(54) SULFIDATED NANOSCALE ZEROVALENT IRON AND METHOD OF USE THEREOF

(71) Applicant: THE ROYAL INSTITUTION FOR THE ADVANCEMENT OF LEARNING/MCGILL UNIVERSITY, Montréal (CA)

(72) Inventors: Sourjya Bhattacharjee, Montreal (CA); Subhasis Ghoshal, Verdun (CA)

(73) Assignee: THE ROYAL INSTITUTION FOR THE ADVANCEMENT OF LEARNING/MCGILL UNIVERSITY, Montréal (CA)

( * ) Notice: Subject to any disclaimer, the term of this patent is extended or adjusted under 35 U.S.C. 154(b) by 291 days.

(21) Appl. No.: 16/522,940

(22) Filed: Jul. 26, 2019

(65) Prior Publication Data
US 2020/0031695 A1    Jan. 30, 2020

Related U.S. Application Data

(60) Provisional application No. 62/703,610, filed on Jul. 26, 2018.

(51) Int. Cl.
| | | |
|---|---|---|
| B09C 1/00 | (2006.01) | |
| B09C 1/08 | (2006.01) | |
| C01G 1/12 | (2006.01) | |
| C01G 49/12 | (2006.01) | |
| C02F 1/70 | (2006.01) | |
| C02F 103/06 | (2006.01) | |
| C02F 101/36 | (2006.01) | |

(52) U.S. Cl.
CPC .............. *C02F 1/705* (2013.01); *B09C 1/002* (2013.01); *B09C 1/08* (2013.01); *C01G 1/12* (2013.01); *C01G 49/12* (2013.01); *B09C 1/00* (2013.01); *B09C 2101/00* (2013.01); *C02F 2101/36* (2013.01); *C02F 2103/06* (2013.01); *C02F 2305/08* (2013.01)

(58) Field of Classification Search
CPC .. B09C 1/00; B09C 1/002; B09C 1/08; B09C 2101/00; C01G 1/12; C01G 49/12; C02F 1/705; C02F 2101/36; C02F 2103/06; C02F 2305/08
See application file for complete search history.

(56) References Cited

PUBLICATIONS

Bhattacharjee, S. & Ghoshal, S. "Phase transfer of palladized nanoscale zerovalent iron for environmental remediation of trichloroethene". Environmental Science & Technology 2016, 50, (16), pp. 8631-8639.

Cao, Z. et al. "Removal of antibiotic florfenicol by sulfide-modified nanoscale zero-valent iron". Environmental Science & Technology 2017, 51, (19), pp. 11269-11277.

Fan, D. et al. "Reductive sequestration of pertechnetate (99TcO4-) by nano zerovalent iron (nZVI) transformed by abiotic sulfide". Environmental Science & Technology 2013, 47, (10), pp. 5302-5310.

(Continued)

*Primary Examiner* — Lucas A Stelling
(74) *Attorney, Agent, or Firm* — Norton Rose Fulbright Canada LLP

(57) ABSTRACT

The present disclosure relates to sulfur-containing zerovalent iron nanoparticles and the use of same for transforming chlorinated solvent pollutants and which may therefore be useful as water treatment technology for restoration of groundwater resources contaminated with toxic, chlorinated solvent pollutants.

20 Claims, 18 Drawing Sheets

(56) References Cited

PUBLICATIONS

Fan, D. et al. "Sulfidation of nano zerovalent iron (nZVI) for improved selectivity during in-situ chemical reduction (ISCR)". Environmental Science & Technology 2016, 50, (17), 9558-9565.

Han, Y. & Yan, W. "Reductive Dechlorination of Trichloroethene by Zero-valent Iron Nanoparticles: Reactivity Enhancement through Sulfidation Treatment". Environmental Science & Technology 2016, 50, (23), pp. 12992-13001.

Li, D. et al. "Reductive transformation of tetrabromobisphenol A by sulfidated nano zerovalent iron". Water Research 2016, 103, pp. 1-9.

Liu, Y. et al. "TCE dechlorination rates, pathways, and efficiency of nanoscale iron particles with different properties". Environmental Science & Technology 2005, 39, (5), pp. 1338-1345.

Mukherjee, R. et al. "A review on synthesis, characterization, and applications of nano zero valent iron (nZVI) for environmental remediation". Critical Reviews in Environmental Science and Technology 2016, 46, (5), pp. 443-466.

O'Carroll, D. et al. "Nanoscale zero valent iron and bimetallic particles for contaminated site remediation". Advances in Water Resources 2013, 51, pp. 104-122.

Rajasekar et al. "Enhanced reductive dechlorination of trichloroethylene by sulfidated nanoscale zerovalent iron". Water Research 2015, 78, pp. 144-153.

Shi, X. et al. "Synthesis, characterization, and manipulation of dendrimer-stabilized iron sulfide nanoparticles". Nanotechnology 2006, 17, (18), p. 4554.

Su, Y. et al. "Direct synthesis of novel and reactive sulfide-modified nano iron through nanoparticle seeding for improved cadmium-contaminated water treatment". Scientific Reports 2016, 6:24358, pp. 1-13.

Xie, Y. and Cwiertny, D.M. "Chlorinated solvent transformation by palladized zerovalent iron: Mechanistic insights from reductant loading studies and solvent kinetic isotope effects". Environmental Science & Technology 2013, 47, (14), pp. 7940-7948.

Zhang, Y. et al. "Sorption of Perfluoroalkyl Acids to Fresh and Aged Nanoscale Zerovalent Iron Particles". Environmental Science & Technology 2018.

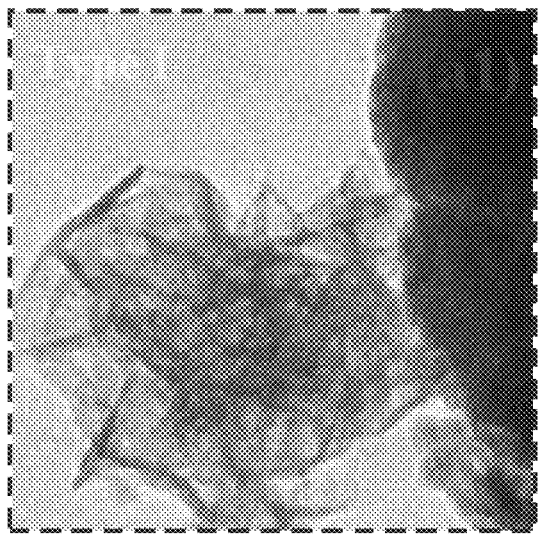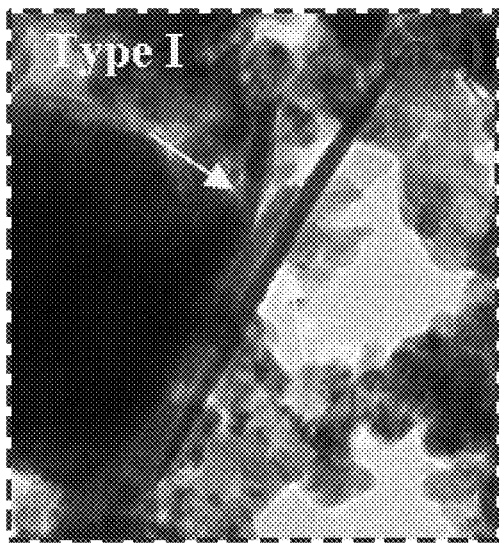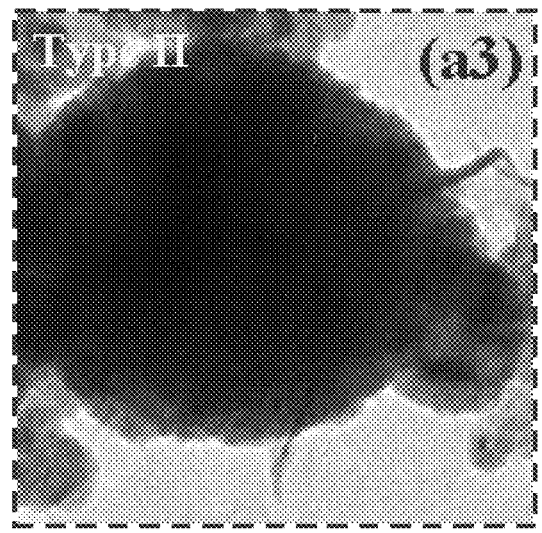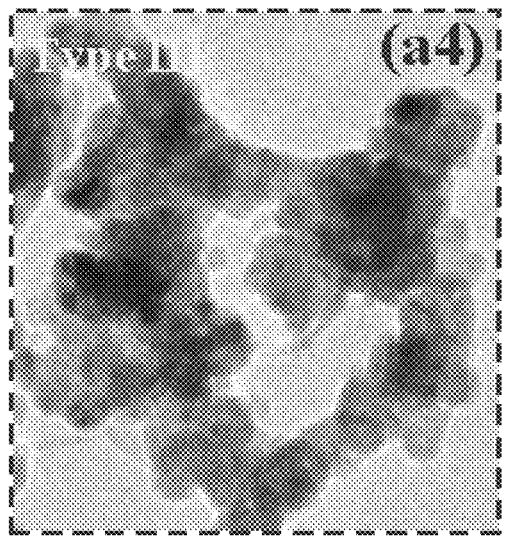
FIG. 1(a1) - (a4)

SPOT A

SPOT B

SPOT A

SPOT B

SPOT A

SPOT C

SPOT B

SPOT A

SPOT B

SULFIDATED NANOSCALE ZEROVALENT IRON AND METHOD OF USE THEREOF

CROSS-REFERENCE TO RELATED APPLICATION

The present application claims benefit of U.S. Provisional Application No. 62/703,610 filed Jul. 26, 2018, the content of which is hereby incorporated by reference in its entirety.

TECHNICAL FIELD

The present disclosure relates to sulfur-containing zerovalent iron nanoparticles (nZVI) and the use of same for transforming chlorinated solvent pollutants with degradation capacity equivalent to palladium-doped nZVI, and which may therefore be useful as water treatment technology for restoration of groundwater resources contaminated with toxic, chlorinated solvent pollutants.

BACKGROUND ART

Zerovalent iron is a strong reducing agent that can effectively transform chlorinated organic compounds, such as chlorinated solvents, including trichloroethylene (TCE), to non-toxic end products. For example, TCE is a widely used industrial solvent. Accidental spills and past improper disposal practices of TCE have led to widespread soil and groundwater contamination. Drinking water standards for TCE and many other chlorinated organic contaminants are in the range of 5 µg/L, and thus even relatively small spills have significant potential to pollute large volumes of groundwater. Zerovalent iron nanoparticles can transform TCE into non-toxic products such as acetylene, ethene, and ethane by the β-elimination pathway, whereas macroparticles of zerovalent iron degrade TCE through the hydrogenolysis pathway which involve production of very toxic intermediates such as vinyl chloride. Direct sub-surface injection of nanoscale zerovalent iron (nZVI) near TCE contamination source zones has been suggested as a promising approach for rapid in situ remediation of aquifers. There are challenges to successful implementation of this technology. For example, nZVI preferentially reacts with water compared to TCE, thus lowering the overall capability of nZVI for TCE degradation. Modifications to nZVI such as depositing secondary metal such as palladium on its surface (Pd-nZVI) improves nZVI performance. However, Pd-nZVI is expensive and potentially toxic when released in the environment.

Sulfidation of nZVI resulting by a number of reagents has been suggested as a method to improve the reactivity of pure nZVI. However, the reactivity of those sulfidated particles have not been shown to be comparable to Pd-nZVI.

There is thus still a need to be provided with new reagents and an improved method for the de-chlorination of chlorinated organic compounds.

SUMMARY

In accordance with the present disclosure, there is provided a specific architecture of sulfidated nanoscale zerovalent iron (S-nZVI$_{co}$), wherein said S-nZVI$_{co}$ is comprising a core comprising FeS and Fe$^0$ and a shell comprising FeS and Fe oxides, wherein said FeS is bridging said core and said shell.

In accordance with the present disclosure, there is provided a process for preparing a sulfidated nanoscale zerovalent iron (S-nZVI$_{co}$), comprising synthesizing said S-nZVI$_{co}$ in one step comprising (or consisting of) mixing together a sulfide reagent capable of providing sulfur (preferably substantially completely) as a hydrosulfide species (HS$^-$), a borohydride reducing agent and FeSO$_4$ in a single reactor under an oxygen-free atmosphere.

In accordance with the present disclosure, there is provided a method for reducing a concentration of a chlorinated organic compound in an aqueous medium comprising contacting said aqueous medium with S-nZVI$_{co}$ as defined herein.

In an embodiment, the S-nZVI$_{co}$ particle comprises a Specific Degradation Capacity (SDC)=(moles of TCE degraded)/(moles of initial Fe$^0$) greater than or equal to 0.3.

In another embodiment, the S-nZVI$_{co}$ particle has a ratio [S/Fe]$_{particle}$/[S/Fe]$_{dosed}$ of about 1.

In a further embodiment, the S-nZVI$_{co}$ particle has a ratio [S/Fe]$_{particle}$/[S/Fe]$_{dosed}$ of about 0.9.

In an embodiment, the S-nZVI$_{co}$ particle has a ratio of moles of initial Fe$^0$/mole of Fe less than about 0.8.

In a supplemental embodiment, the S-nZVI$_{co}$ particle has a ratio of moles of initial Fe$^0$/mole of Fe of less than or equal to the Fe$^0$ content.

In an embodiment, the S-nZVI$_{co}$ has a [S/Fe]$_{dosed}$ ranging from 0.035 to 0.4.

In another embodiment, the S-nZVI$_{co}$ particle has a [S/Fe]$_{particle}$ ratio higher than zero, preferably higher than about 0.01, more preferably higher than about 0.02, and most preferably higher than about 0.03, such as higher than about 0.035.

In a further embodiment, the S-nZVI$_{co}$ particle has a [S/Fe]$_{particle}$ ratio of less than about 0.8, preferably less than about 0.7, more preferably less than about 0.6, even more preferably less than about 0.5 and most preferably less than about 0.4.

In an embodiment, the S-nZVI$_{co}$ particle has a [S/Fe]$_{particle}$ ratio of less than about 0.4.

It is further provided a method for degrading to non-toxic chemicals in a contaminated aqueous medium comprising contacting said aqueous medium with an S-nZVI$_{co}$ particle as defined herein.

It is further provided a method for reducing a concentration of a chlorinated organic compound in a contaminated medium comprising contacting said aqueous medium with an S-nZVI$_{co}$ particle as defined herein.

In an embodiment, the contaminated medium is an aqueous medium or a soil.

In another embodiment, the aqueous medium is groundwater.

In another embodiment, S-nZVI$_{co}$ has TCE specific degradation capacity comparable to Pd-nZVI at TCE concentrations in excess of the stoichiometric minimum required for its full conversion by Fe$^0$.

It is further provided a process for preparing a sulfidated nanoscale zerovalent iron (S-nZVI$_{co}$) as defined herein, comprising synthesizing said S-nZVI$_{co}$ in one step comprising mixing together a sulfide reagent capable of providing sulfur as a hydrosulfide species (HS–), a borohydride reducing agent and FeSO$_4$ in a single reactor under an oxygen-free atmosphere.

In an embodiment, the step of mixing comprises adding said sulfide reagent and said borohydride reducing agent together to said FeSO$_4$.

In another embodiment, at least one of the sulfide reagent, borohydride and FeSO$_4$ is in an aqueous medium.

In an additional embodiment, the sulfide reagent is $Na_2S$, said borohydride is $NaBH_4$, and said $FeSO_4$ is a hydrate of $FeSO_4$.

In an embodiment, the process described herein further comprises washing and drying said S-nZVI$_{co}$ under said oxygen-free atmosphere.

In an embodiment, the S-nZVI$_{co}$ particle has a particle in the size range of 100-150 nm, of 50-200 nm, or of 20-30 nm.

In another embodiment, the particle comprises a rough surface or as a well-defined spherical boundary.

BRIEF DESCRIPTION OF THE DRAWINGS

Reference will now be made to the accompanying drawings.

DETAILED DESCRIPTION

Figure 1A:
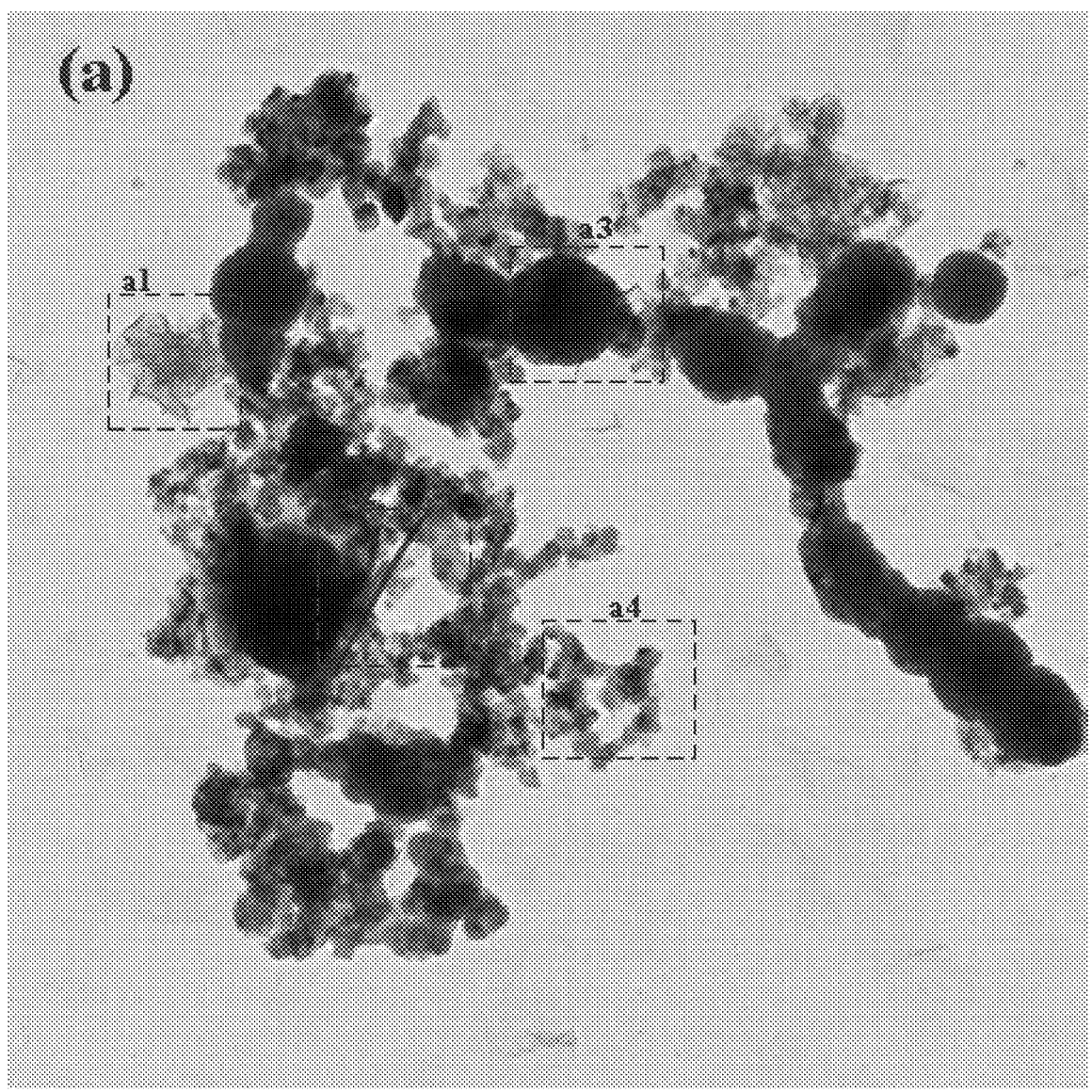
FIG. 1 is (a) representative TEM image of S-nZVI$_{co}$-(a1)-(a4) are blown-up images of the sections highlighted by the dotted boxes in FIG. 1*a*; and (b) representative TEM image of S-nZVI$_{post}$—(b1) is the blown-up image of the dotted boxed area in FIG. 1*b*.

There is provided sulfur-containing zerovalent iron nanoparticles (S-nZVI). The S-nZVI may be used in applications such as the transformation of chlorinated organic compounds, such as chlorinated solvents into non-toxic products, in particular in the field of water treatment.

In one embodiment, there is provided a sulfidated nanoscale zerovalent iron (S-nZVI$_{co}$), wherein said S-nZVI$_{co}$ is comprising a core comprising FeS and $Fe^0$ and a shell comprising FeS and Fe oxides, wherein said FeS is bridging said core and said shell.

In one embodiment, there is provided a sulfidated nanoscale zerovalent iron (S-nZVI$_{co}$), wherein said S-nZVI$_{co}$ is comprising a core comprising FeS and $Fe^0$ and a shell comprising FeS and iron oxides, wherein said FeS is bridging said core and said shell.

The core of said S-nZVI$_{co}$ is substantially free of $S^0$.

As recited above, said S-nZVI$_{co}$ provides said FeS is bridging said core and said shell, wherein said bridging is operatively allowing electron transfer from said $Fe^0$ (from the core) to the external surface of said shell.

In one embodiment, said S-nZVI$_{co}$ particle has a Specific Degradation Capacity (SDC)=(moles of TCE degraded)/(moles of initial)$Fe^0$ greater than or equal to 0.3.

In one embodiment, said S-nZVI$_{co}$ particle has a ratio [S/Fe]$_{particle}$/[S/Fe]$_{dosed}$ of about 1, preferably higher than about 0.9, at least for a [S/Fe]$_{dosed}$ ranging from 0.035 to 0.4, wherein [S/Fe]$_{dosed}$ is the mole ratio of total S/total Fe employed for preparing said nanoparticle, and [S/Fe]$_{particle}$ is the mole ratio of total S incorporated/total Fe in said nanoparticle as assessed by ICP-OES.

In one embodiment, said S-nZVI$_{co}$ particle has a ratio of moles of initial $Fe^0$/mole of Fe less than about 0.8, preferably less than or equal to the $Fe^0$ content as defined herein, preferably in a [S/Fe]$_{dosed}$ ranging from 0.035 to 0.4.

In one embodiment, said S-nZVI$_{co}$ particle has a [S/Fe]$_{particle}$ ratio higher than zero (0), preferably higher than about 0.01, or higher than about 0.02 or higher than about 0.03, such as higher than about 0.035 and said S-nZVI$_{co}$ particle has a [S/Fe]$_{particle}$ ratio less than about 0.8 or less than about 0.7 or less than about 0.6 or less than about 0.7 or less than about 0.4.

An embodiment relates to a process for preparing a sulfidated nanoscale zerovalent iron (S-nZVI$_{co}$), comprising synthesizing said S-nZVI$_{co}$ in one step comprising (or consisting of) mixing together a sulfide reagent capable of providing sulfur (preferably substantially completely) as a hydrosulfide species (HS$^-$), a borohydride reducing agent and $FeSO_4$ in a single reactor under an oxygen-free atmosphere.

In one embodiment, the step of mixing is comprising adding said sulfide reagent and said borohydride reducing agent together to said $FeSO_4$.

In one embodiment, said sulfide reagent and said borohydride are in an aqueous medium.

In one embodiment, said $FeSO_4$ is in an aqueous medium.

In one embodiment, said sulfide reagent, said borohydride and said $FeSO_4$ are in an aqueous medium.

In one embodiment, said sulfide reagent is $Na_2S$.

In one embodiment, said borohydride is $NaBH_4$.

In one embodiment, said $FeSO_4$ is a hydrate of $FeSO_4$.

In one embodiment, the process is further comprising washing and drying said S-nZVI$_{co}$ under said oxygen-free atmosphere.

In one embodiment, the washing is comprising washing with an organic, nonaqueous solvent capable of drying the particles, an example being an alcohol, such as methanol and ethanol.

In one embodiment, the drying is comprising drying on standing under oxygen-free atmosphere, vacuum drying under oxygen-free atmosphere or drying under nitrogen flow.

The mixing together of the reagents above is causing the co-precipitation of FeS and $Fe^0$, and thereby resulting in the sulfidated nanoscale zerovalent iron (S-nZVI$_{co}$) as described herein.

Figure 1B:
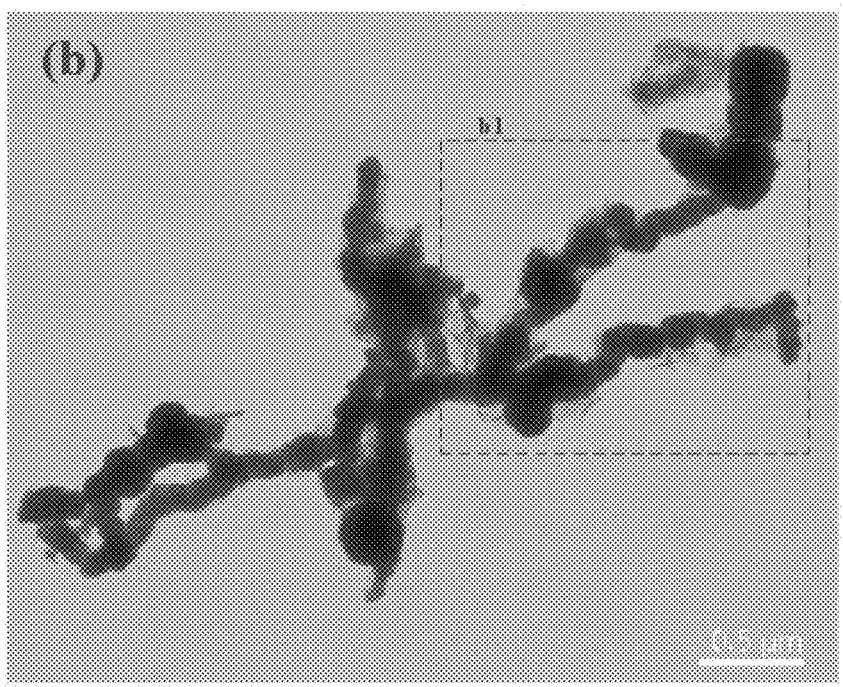

It is provided herein a detailed comparison of the characteristics in morphologies and surface chemistry of S-nZVI$_{co}$ and S-nZVI$_{post}$ using TEM-EDS and XPS. The representative TEM images of S-nZVI$_{co}$ and S-nZVI$_{post}$ are shown in FIGS. 1a and 1b, respectively. Overall, four distinct morphologies were observed in the images; needle and plate-like structures which were often observed together (Type I), spherical particles in the size range of 100-150 nm with a rough surface (Type II), small irregular particles in the size range of 20-30 nm (Type III), and particles in the size range of 50-200 nm with well-defined spherical boundaries (Type IV). S-nZVI$_{co}$ was abundant in Type I, Type II and Type III morphologies while Type IV was rarely observed. In contrast, S-nZVI$_{post}$ was primarily composed of Type I and Type IV morphologies.

Figure 1:
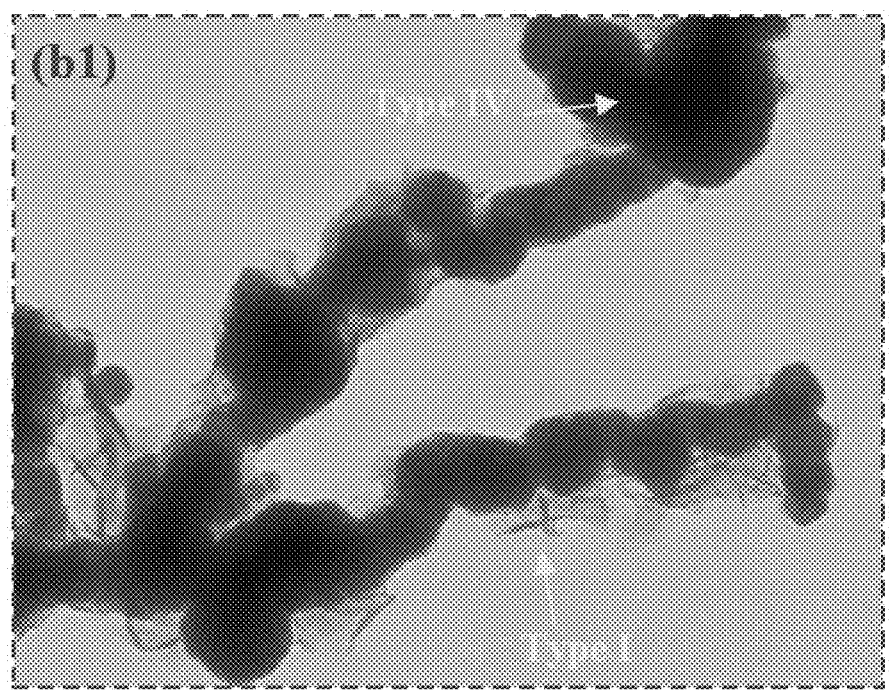
Figure 4:
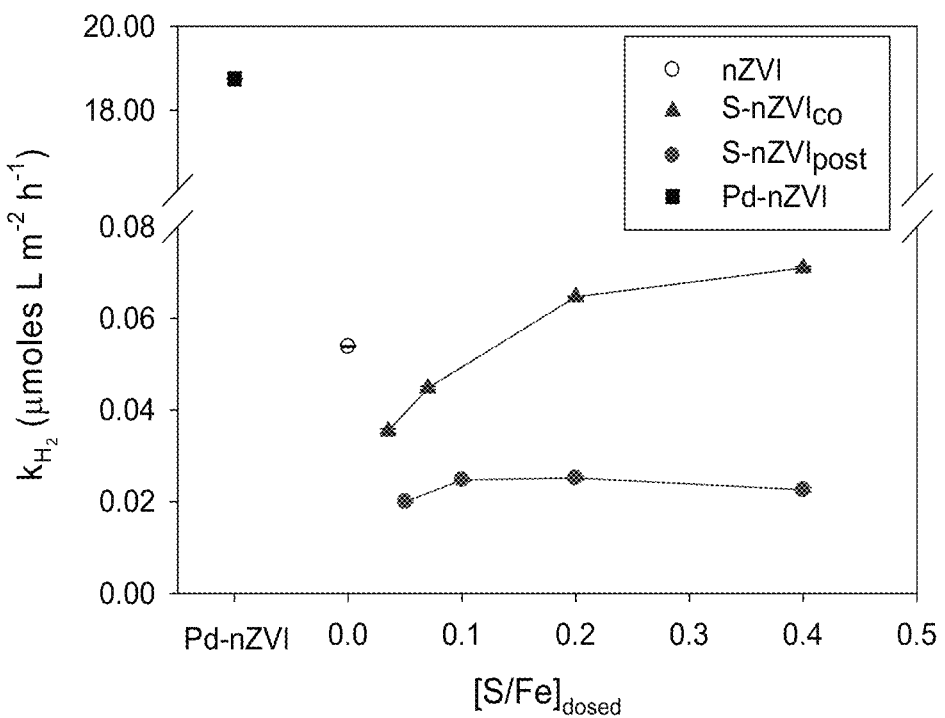
FIG. 4 illustrates the surface area normalized zero order hydrogen evolution rate constants for certain nZVI particles wherein the error bars represent standard deviation from triplicate reactors.
Figure 5A:
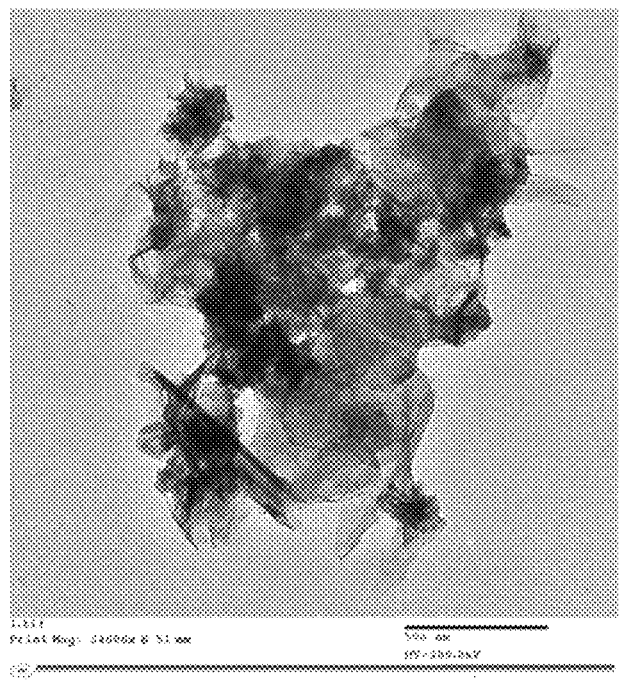
FIG. 5 represents TEM image of (a) nZVI in accordance with this disclosure and (b) a comparative nZVI, after reaction with TCE ([S/Fe]$_{dosd}$=0.4).
Figure 5B:
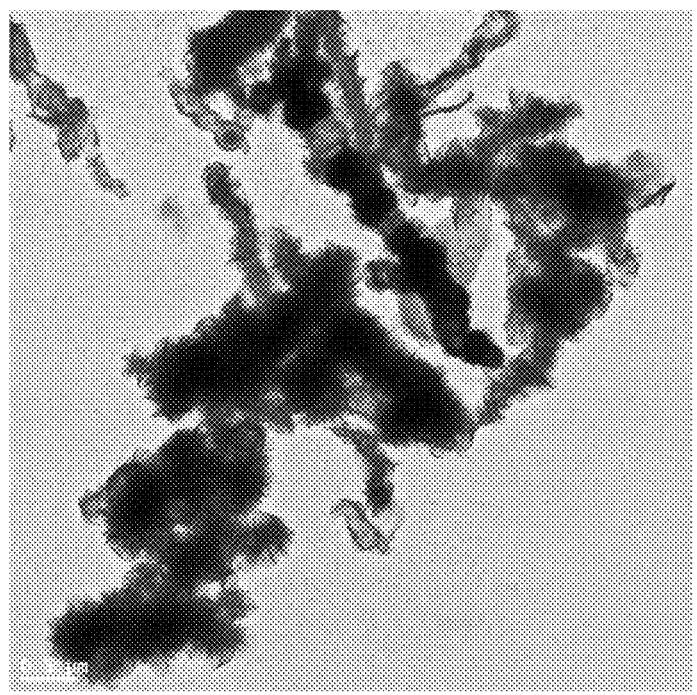
Figure 6A:
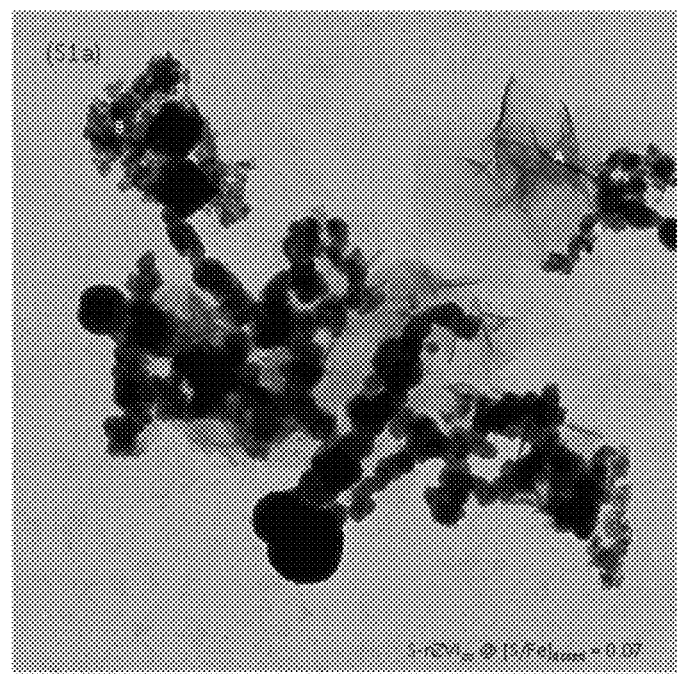
FIG. 6 represents TEM images and corresponding EDS analysis of nZVI in accordance with this disclosure at (a) [S/Fe]$_{dosed}$=0.07 (b) [S/Fe]$_{dosed}$=0.2 (c) [S/Fe]$_{dosed}$=0.3 and (d) [S/Fe]$_{dosed}$=0.4.
Figure 6A:
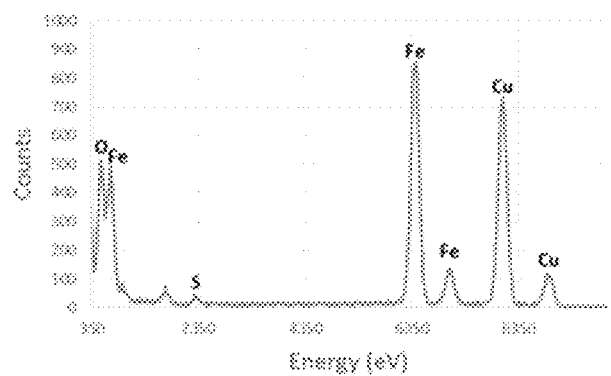
Figure 6A:
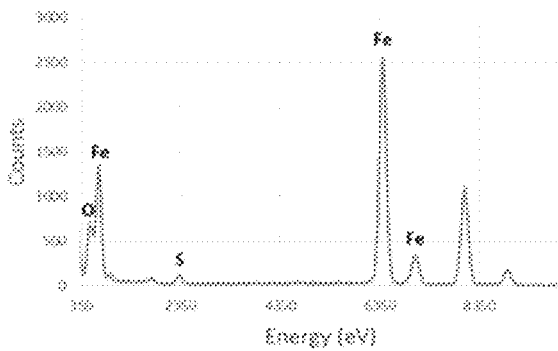
Figure 6B:
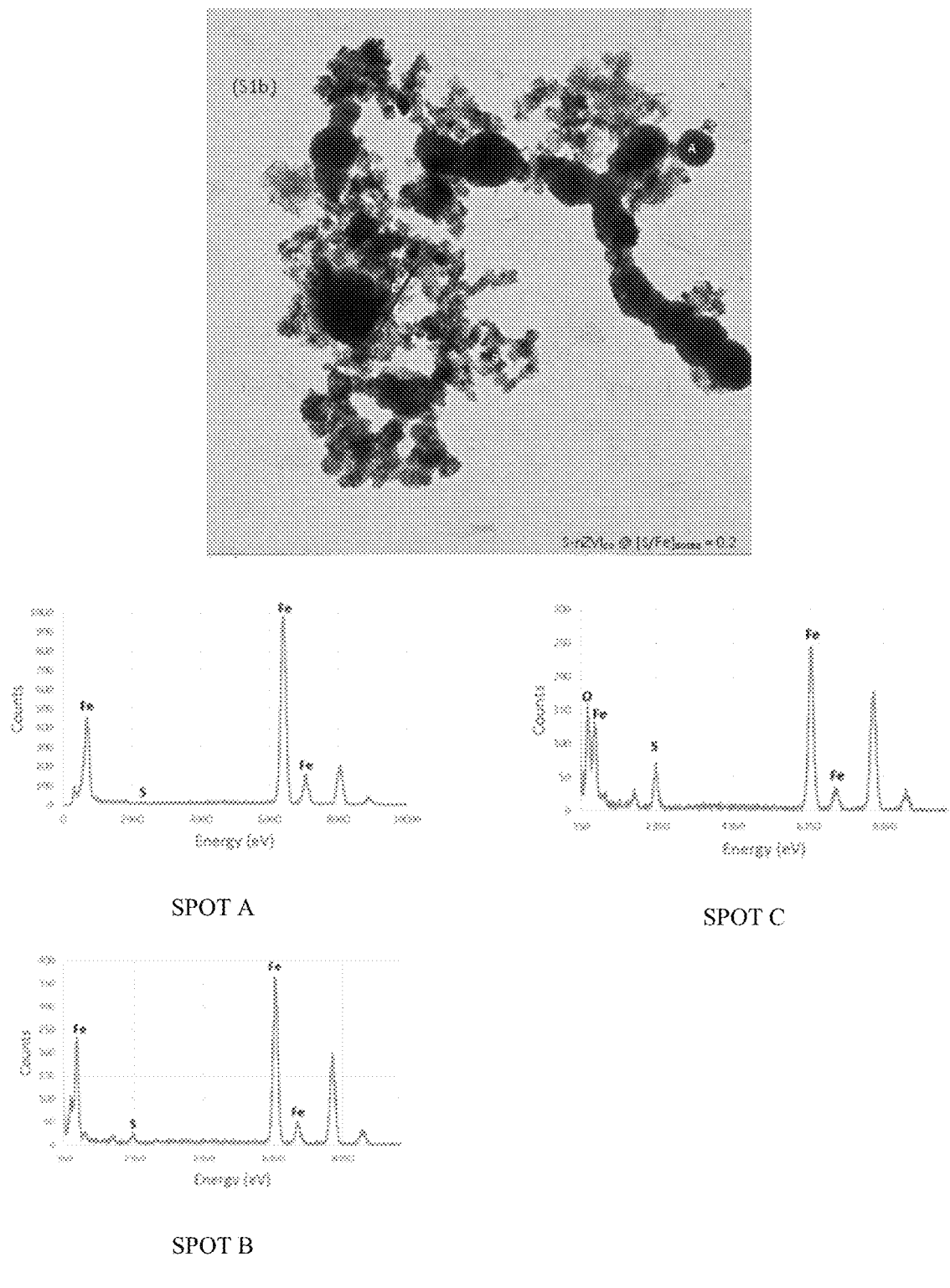
Figure 6C:
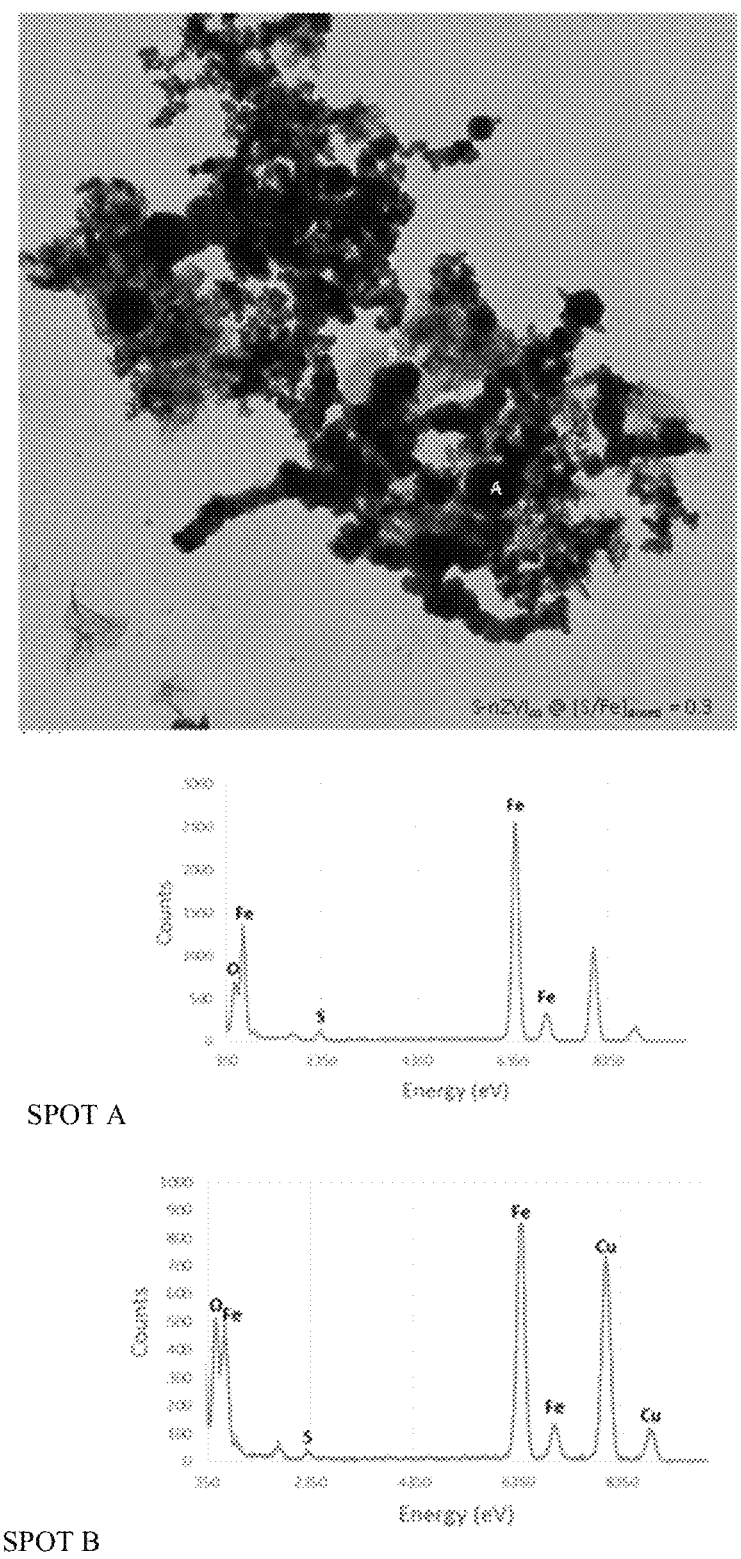
Figure 6D:
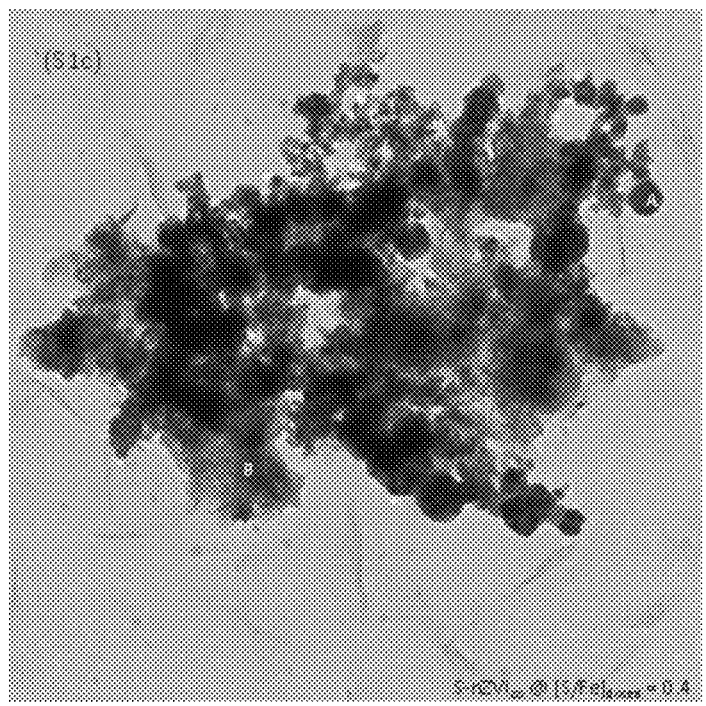
Figure 6D:
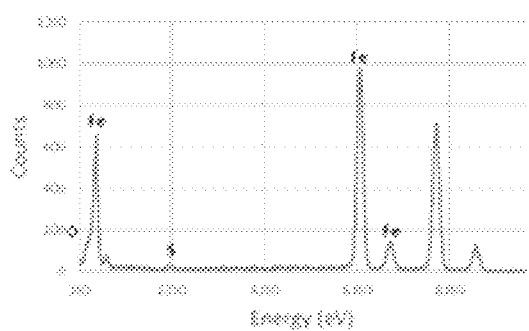
Figure 6D:
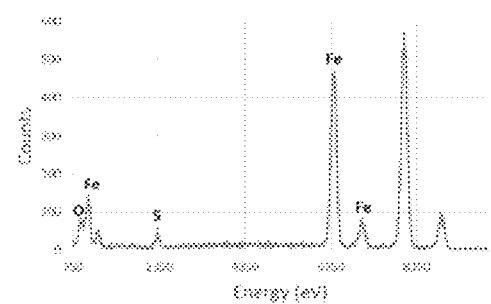
Figure 6D:
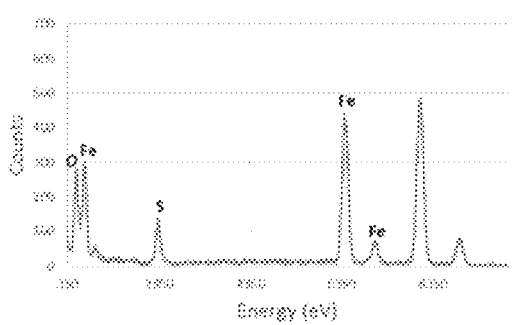
Figure 7A:
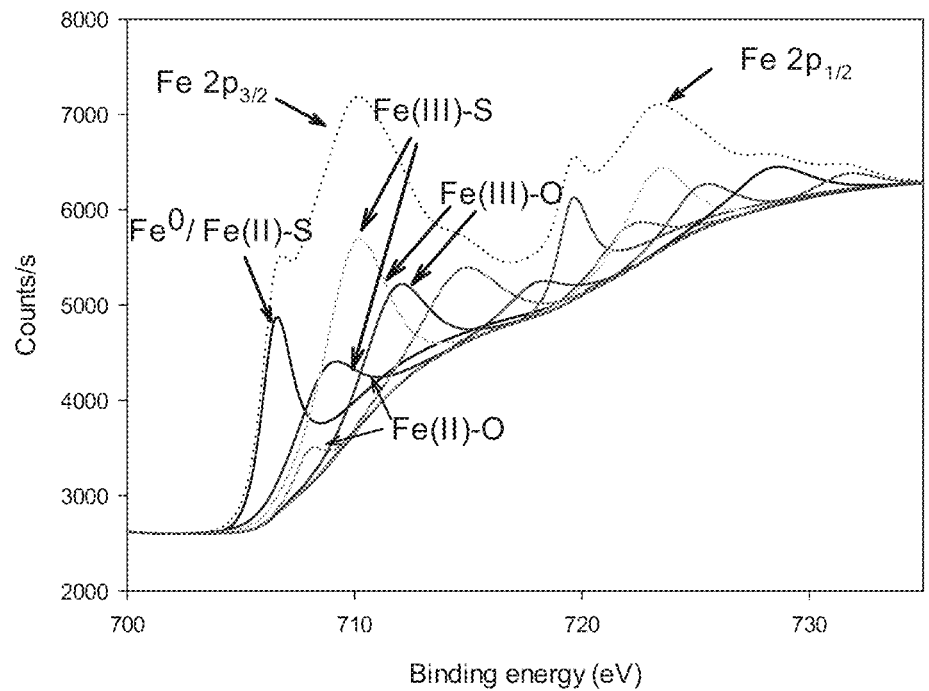
FIG. 7 is XPS analysis of S-nZVI$_{co}$ showing un (a) Fe 2p spectra and (b) S 2p spectra.
Figure 7B:
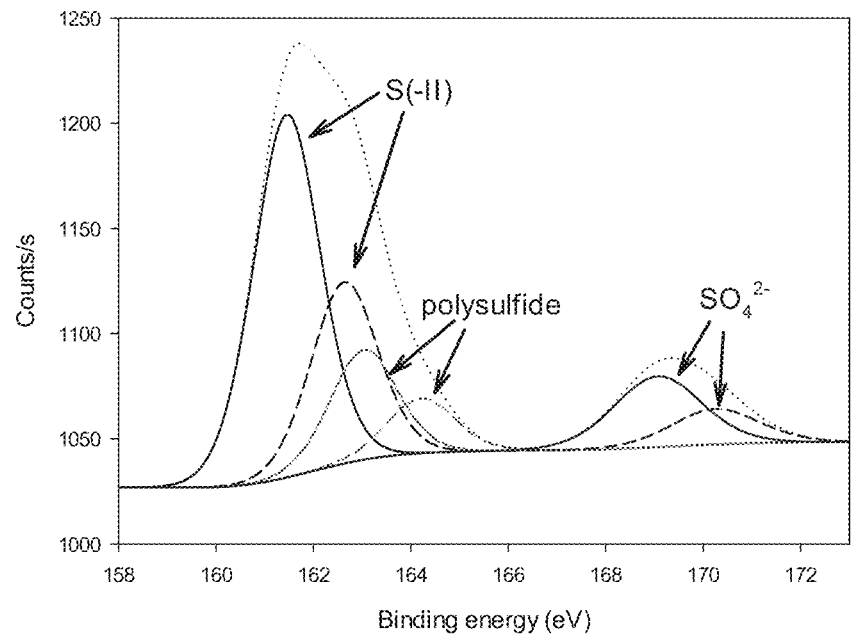

FIGS. 1a1-1a4 are blown up images of sections in FIG. 1 that highlight the different morphologies observed for S-nZVI$_{co}$. As seen in FIGS. 1a1 and 1a2, Type I morphology consisted of laminar structures which resembled a mix of needles and thin plates. There were also Type I structures which were embedded within the Type II particles. EDS analyses of Type I structures generated S signals along with Fe suggesting that they were likely iron sulfides (FIG. 6). Relatively small O signals were also present. Previous studies have attributed the laminar shapes to FeS (Fan et al., 2013, *Environmental science & technology*, 47, 10: 5302-5310; Su et al., 2016, *Scientific reports*, 6: 24358; and Shi et al., 2006, *Nanotechnology*, 17(18): 4554). Moreover, pure nano-FeS also shows a similar structure (Zhang et al., 2018, *Environmental Science & Technology*). XPS analysis of the S-nZVI$_{co}$ (FIG. 7) shows the predominance of FeS and to a lesser extent the presence of polysulfides and sulfates. FIGS. 7a and 7b, show the deconvoluted peaks in the Fe 2p and S 2p region for S-nZVI$_{co}$, respectively. In the Fe 2p3/2 spectra, a peak at 707 eV was observed which are attributed to $Fe^0$ and FeS. The existence of FeS is confirmed by the presence of S2− peak in the S 2p3/2 spectra (FIG. 7b) at 161 eV. The S 2p spectra comprises of contributions from the 2p3/2 and 2p1/2 spin orbitals represented as the solid and dashed lines respectively in FIG. 7b. Iron oxide peaks appear at 708 eV and 709 eV attributable to Fe(II) oxides, and at 711 eV and 712 eV attributable to Fe(III) oxides. However the peaks at 709 and 711 eV can also be attributed to Fe(III)-sulfides due to presence of polysulfide peaks in the S 2p3/2 spectra at 163 eV. A contribution of sulfate species is also seen at 169 eV. The speciation of S-nZVI$_{co}$ did not change at different $[S/Fe]_{dosed}$.

Overall, XPS analysis of S-nZVIco (FIG. 7) showed predominance of FeS. This suggests that the Type I structures are FeS. FIG. 1a2 shows the Type II morphology observed for S-nZVI$_{co}$ and these were spherical particles with a granular appearance and surface roughness. EDS analysis of the particle surface provided signals for Fe and S. The surface roughness of Type II particles may have been caused due to the entrapment of Type I FeS structures. FIG. 1a3 shows the Type III morphology which were 20-30 nm irregularly shaped particles, the EDS for which provided Fe and S signals. The Type III particles were observed to be enmeshed with Type I structures, usually at higher $[S/Fe]_{dosed}$ (FIG. 6). The presence of the smaller Type III particles likely resulted in the small increases in the BET surface area for S-nZVI$_{co}$ with increasing $[S/Fe]_{dosed}$ (see Table 1).

TABLE 1

BET surface areas of the different nanoparticles

| Sample | $[S/Fe]_{dosed}$ | BET surface area (m$^2$/g) |
|---|---|---|
| nZVI | 0 | 19.8 ± 2.1 |
| S-nZVI$_{co}$ | 0.035 | 20.42 ± 1 |
| | 0.05 | 20.26 ± 1.5 |
| | 0.07 | 21.2 ± 1.1 |
| | 0.1 | 22.1 ± 0.9 |
| | 0.2 | 23.2 ± 2 |
| | 0.3 | 26.58 ± 1.8 |
| | 0.4 | 30.67 ± 2 |
| S-nZVI$_{post}$ | 0.035 | 20.77 ± 1.1 |
| | 0.05 | 20.51 ± 1.5 |
| | 0.07 | 21.1 ± 1.2 |
| | 0.1 | 20.66 ± 0.5 |
| | 0.2 | 20.4 ± 0.9 |
| | 0.3 | 21.3 ± 2 |
| | 0.4 | 19.72 ± 1 |
| Pd-nZVI | 0 | 20.1 ± 1 |

Overall, the location of FeS structures were observed both within and on the surface of the particles. In addition, the FeS structures formed extensive mesh like networks with increasing $[S/Fe]_{dosed}$ (FIG. 6), suggesting that multiple $Fe^0$ rich sites were bridged together in aqueous suspension, maximizing $Fe^0$ and FeS contact.

Figure 8:
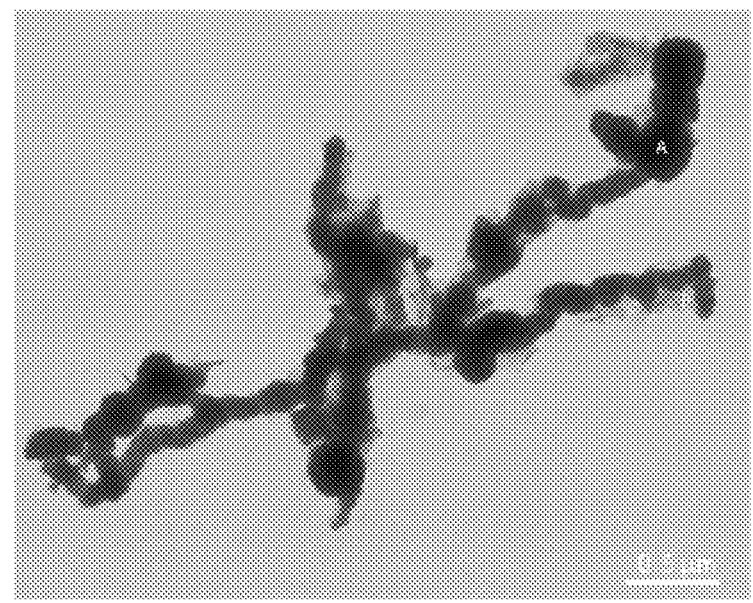
FIG. 8 is a TEM image and an EDS spectra of a comparative nZVI at [S/Fe]$_{dosed}$=0.4.
Figure 8:
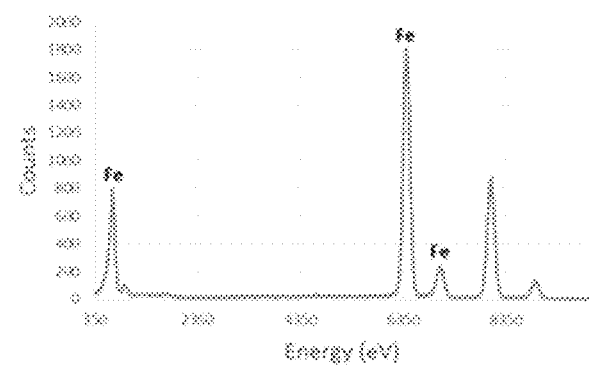
Figure 8:
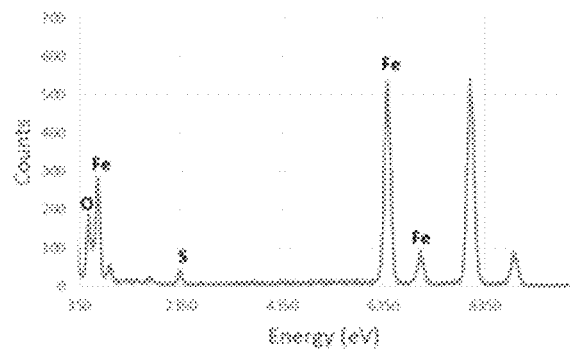
Figure 9A:
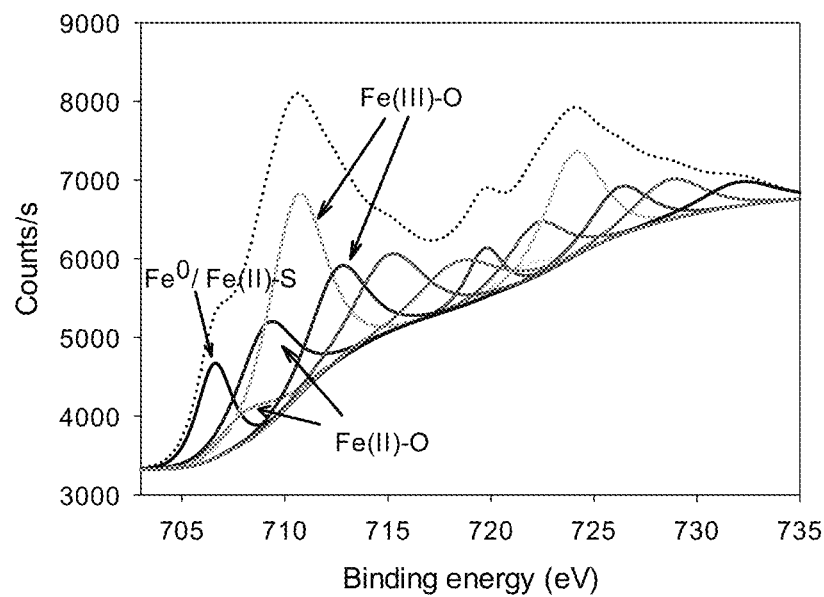
FIG. 9 is an XPS analysis of a comparative nZVI showing in (a) Fe 2p spectra and (b) S 2p spectra.
Figure 9:
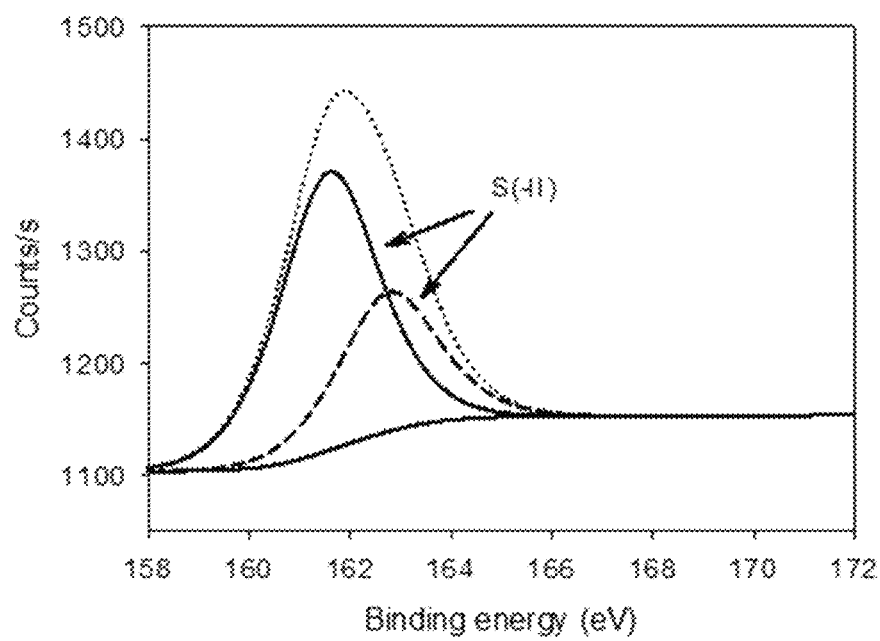

In contrast, S-nZVI$_{post}$ particles were abundant in Type IV morphology. The particles generally had a smooth spherical particle edge and were also observed to be associated with Type I FeS structures. However, the FeS structures were located primarily on the outer surface of the spherical particles (FIG. 8) unlike that observed for S-nZVI$_{co}$. XPS analysis of S-nZVI$_{post}$ primarily showed the presence of FeS (FIG. 9). nZVI and Pd-nZVI employed in this study have been thoroughly characterized elsewhere (Bhattacharjee et al., 2016, *Environmental science & technology*, 50(16): 8631-8639). Both nZVI and Pd-nZVI consisted of spherical particles with primary particle sizes in the range of 20-100 nm.

Also provided is the demonstration of the TCE degradation capacity of S-nZVI$_{co}$ is similar to Pd-nZVI and higher than S-nZVI$_{post}$. The extent of TCE degradation achieved by S-nZVI is an important benchmark for assessing its remediation performance. The specific degradation capacity was evaluated (defined in equation 1) of nZVI, Pd-nZVI, S-nZVI$_{co}$ and S-nZVI$_{post}$ for TCE degradation and they are presented in FIG. 2a. It is important to note that Pd-nZVI particles had no sulfur in them and their results are shown along with S-nZVI for comparison.

$$\text{Specific degradation capacity, } SDS = \frac{\text{moles of } TCE \text{ degraded}}{\text{moles of initial } Fe^0} \quad (1)$$

The SDC was estimated by Equation 1, in systems employing stoichiometrically excess TCE mass compared to $Fe^0$, for time points where no further TCE degradation was observed in each of the reaction systems (FIG. 10).

Figure 2A:
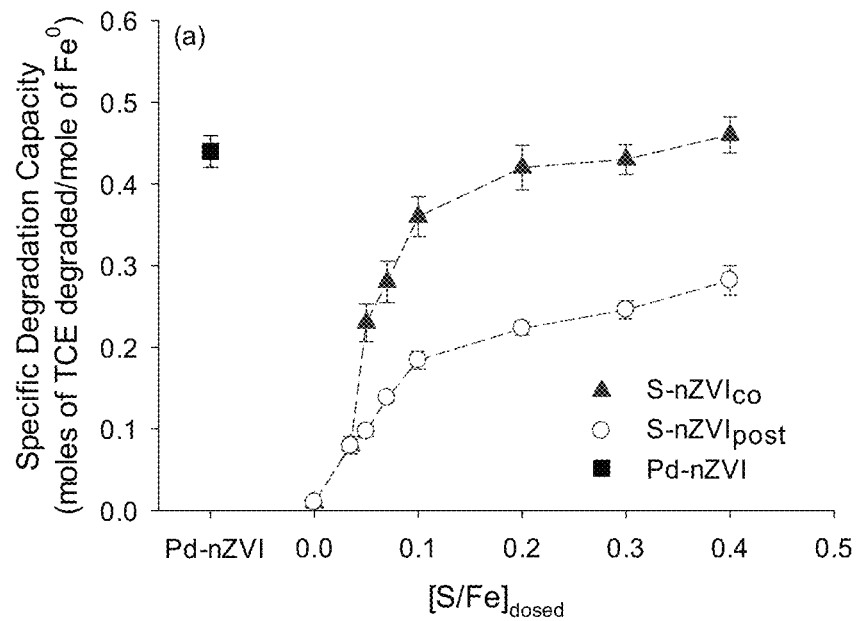
FIG. 2 represents (a) the specific degradation capacities (SDC) of certain nZVI particles; (b) TCE degradation end product distribution for certain nZVI particles (c) ratios of [S/Fe]$_{particle}$/[S/Fe]$_{dosed}$ for nZVI in accordance with this disclosure and a comparative nZVI; and (d) the specific degradation capacities plotted as a function of [S/Fe]$_{particle}$.
Figure 3:
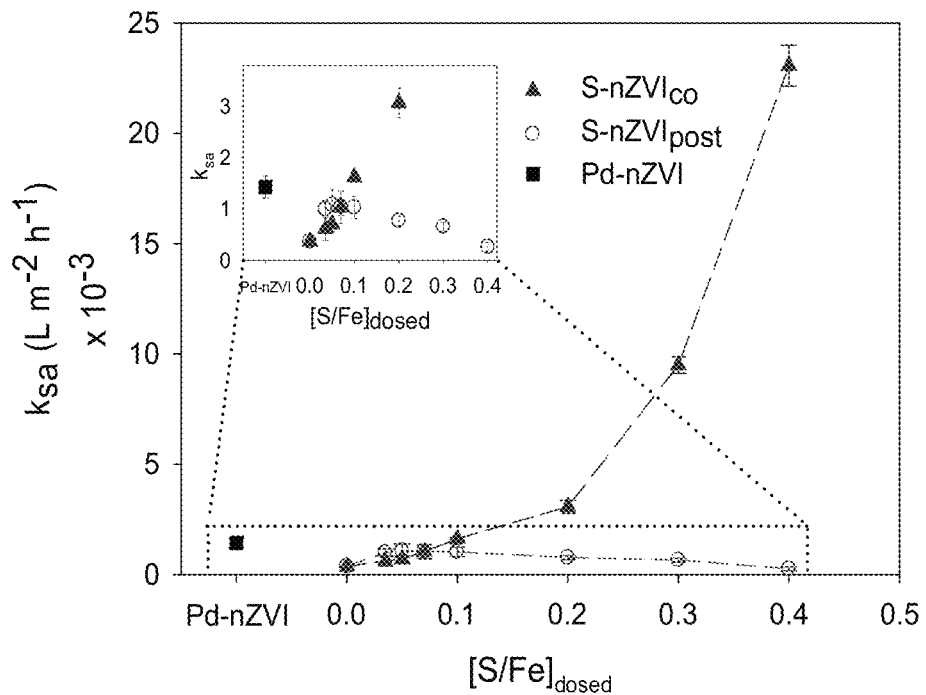
FIG. 3 represents the surface area normalized pseudo first order TCE degradation rate constants (ksa) at different [S/Fe]$_{dosed}$ under $Fe^0$ limited conditions wherein the error bars represent standard deviation from triplicate measurements.

FIG. 2a demonstrates that pure nZVI ($[S/Fe]_{dosed}$=0) achieved a low SDC of 0.01. This was likely due to the preferential reactions of nZVI with water over TCE, because during degradation studies nZVI evolved a total of 57 µmoles of $H_2$ whereas it only dechlorinated 5 µmoles TCE.

However as the $[S/Fe]_{dosed}$ increased from 0.035 to 0.1, the SDC of S-nZVI$_{co}$ increased substantially from 0.08±0.01 to 0.36±0.02. The increase in SDC was smaller between $[S/Fe]_{dosed}$ of 0.1 to 0.4, with a maximum SDC of 0.46±0.02 being achieved at $[S/Fe]_{dosed}$ of 0.4. Conversely, S-nZVI$_{post}$ achieved a maximum SDC of only 0.28±0.02 within a similar range of $[S/Fe]_{dosed}$. Pd-nZVI exhibited an SDC of 0.45±0.02 and varying the Pd loading between 0.5 to 5 wt. % Pd did not significantly alter the SDC value (FIG. 10).

Among the three major TCE degradation products reported for Pd-nZVI and S-nZVI (acetylene, ethene and ethane), the highest SDC theoretically can be achieved when nanoparticles utilize the electrons available per mole of $Fe^0$ to form the least saturated product, i.e., acetylene, and $Fe^0$ can provide up to 3 electrons for TCE dechlorination ($Fe^0 \rightarrow Fe^{2+}+2e^-$; $Fe^{2+} \rightarrow Fe^{3+}+e^-$). Based on this, a theoretical maximum SDC ($SDC_{theor,max}$) of 0.75 can be achieved. Whereas based on availability of 2 electrons per mole of $Fe^0$, nanoparticles can achieve a $SDC_{theor,max}$ of 0.5.

It was previously determined that Pd-nZVI could provide up to 3 electrons per mole of $Fe^0$ to dechlorinate TCE (Bhattacharjee et al., 2016, *Environmental science & technology*, 50(16): 8631-8639). Therefore, as a first step towards understanding the differences in SDC observed in this study, the electrons available per mole of $Fe^0$ for TCE degradation were analyzed in the case of Pd-nZVI, S-nZVI$_{co}$ and S-nZVI$_{post}$.

Figure 2B:
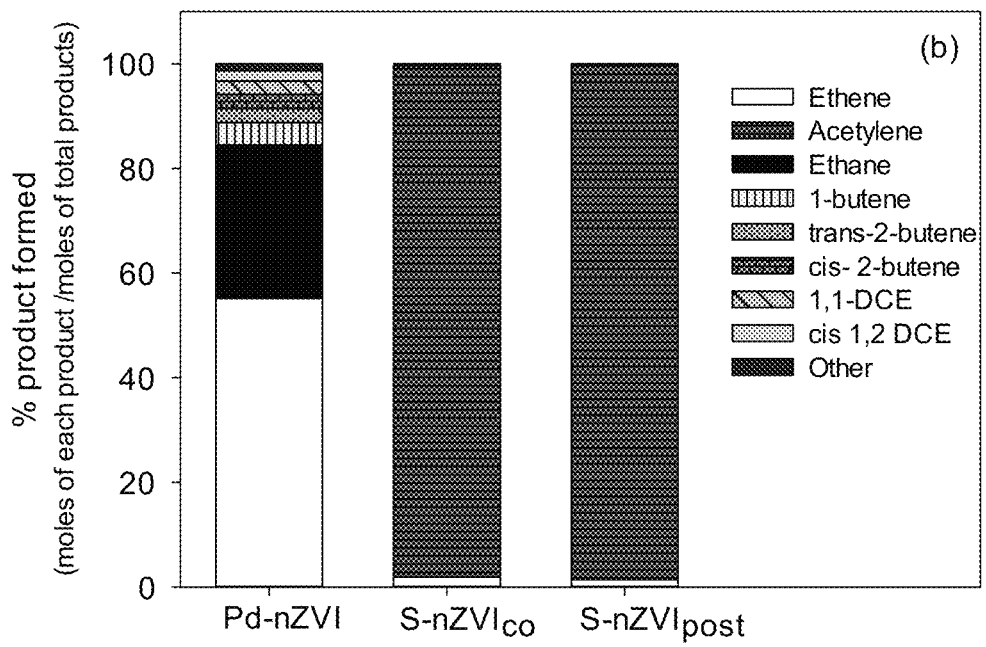

The electron balance on average was ≥90%. Pd-nZVI provided 3 electrons per mole of $Fe^0$ for TCE dechlorination, whereas S-nZVI$_{co}$ and S-nZVI$_{post}$ had 2 electrons per mole of $Fe^0$ available. Despite the availability of lower number of electrons, S-nZVI$_{co}$ achieved a maximum SDC similar to Pd-nZVI, between $[S/Fe]_{dosed}$ of 0.3 and 0.4, as seen in FIG. 2a. the end products were thus compared and generated by Pd-nZVI and S-nZVI$_{co}$ to better understand how the available electrons were being utilized in the degradation process. As shown in FIG. 2b, Pd-nZVI primarily transformed TCE to ethene and ethane, which accounted for 80% of the total dechlorination products. Whereas S-nZVI$_{co}$ degraded TCE predominantly to acetylene (97% of total dechlorination products). Formation of ethene and ethane require 6 and 8 electrons per mole of $Fe^0$ respectively, whereas acetylene requires only 4 electrons. Thus, the generation of acetylene by S-nZVI$_{co}$ enabled it to achieve an SDC equivalent to that of Pd-nZVI despite having lesser electrons available for TCE dechlorination. Thus, S-nZVI$_{co}$ achieves a maximum experimental SDC (0.46) close to $SDC_{theor,max}$ (0.5). However the experimental maximum SDC for Pd-nZVI (0.45) is 40% lower than the $SDC_{theor,max}$ (0.75). This was due to the inefficient electron distribution among the degradation products by Pd-nZVI. Other than ethene and ethane, Pd-nZVI generates several byproducts including dichlorethenes, which maybe undesirable in TCE degradation applications.

Figure 2C:
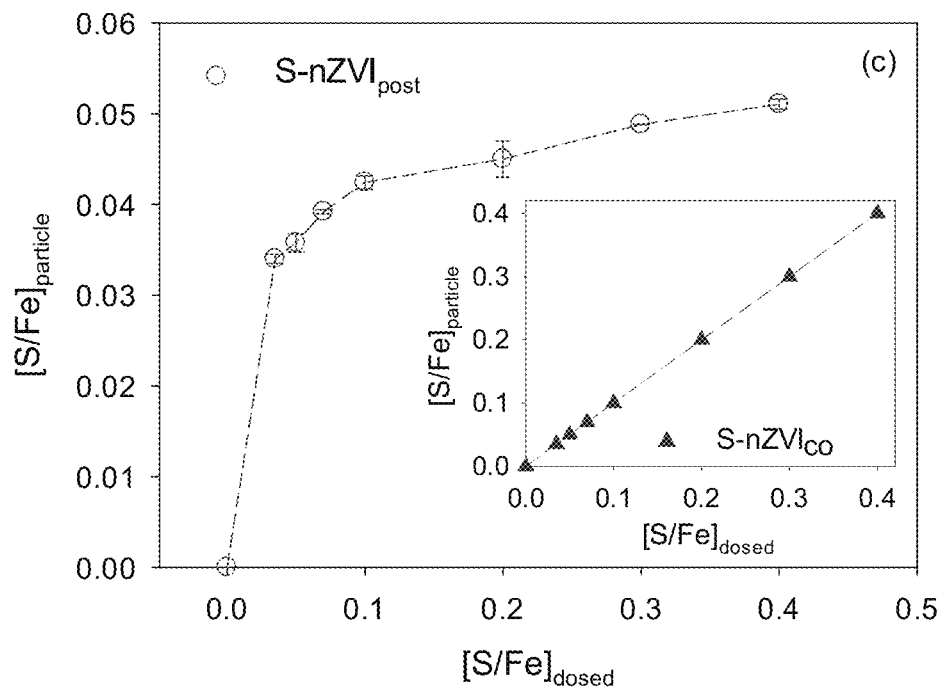
Figure 2D:
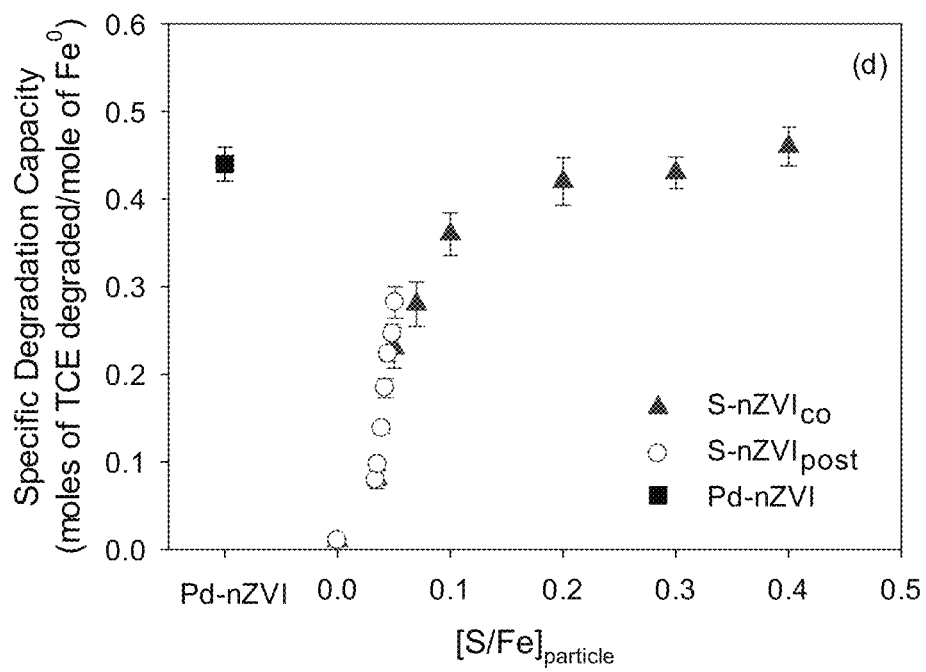

In contrast, S-nZVI$_{post}$ did not achieve an SDC equivalent to S-nZVI$_{co}$ despite a similar availability of 2 electrons per mole of $Fe^0$ and formation of similar degradation products. Additionally, the SDC for both S-nZVI$_{co}$ and S-nZVI$_{post}$ was dependent on the $[S/Fe]_{dosed}$. For S-nZVI$_{co}$ and S-nZVI$_{post}$, FeS plays a critical role in the shuttling of electrons from $Fe^0$ to halogenated contaminants at the surface (Cao et al., 2017, *Environmental science & technology*, 51(19): 11269-11277; Rajajayavel et al., 2015, *Water research*, 78: 144-153; and Li et al., 2016, *Water research*, 103: 1-9). It is thus concluded that the amount of FeS associated with S-nZVI$_{co}$ and S-nZVI$_{post}$ was different at different $[S/Fe]_{dosed}$ which influenced the ability of the nanoparticles to release the available electrons per mole of $Fe^0$ for TCE degradation. Therefore the particle S/Fe ratio ($[S/Fe]_{particle}$) were measured to estimate the amounts of FeS associated with S-nZVI$_{co}$ and S-nZVI$_{post}$ at different $[S/Fe]_{dosed}$. The undeposited sulfur was measured in the aqueous phase and accounted for >97% mass balance. As shown in FIG. 2c, S-nZVI$_{post}$ showed a limited uptake capacity for sulfur over the large range of $[S/Fe]_{dosed}$ employed. Relative to S-nZVI$_{co}$, the $[S/Fe]_{particle}$ values of S-nZVI$_{post}$ were much lower. For instance, at the $[S/Fe]_{dosed}$ of 0.4, the $[S/Fe]_{particle}$ for S-nZVI$_{post}$ was only 0.05 whereas for S-nZVI$_{co}$ it was 0.4. The $[S/Fe]_{particle}$ for S-nZVI$_{post}$ did not change between 15 min to 12 hrs of contact time between nZVI and the $Na_2S$ solutions. Thus, the significantly lower amounts of sulfur associated with S-nZVI$_{post}$ is likely to have caused lower SDC in comparison to S-nZVI$_{co}$. Furthermore by plotting the SDC's as a function of $[S/Fe]_{particle}$ (FIG. 2c), S-nZVI$_{post}$ and S-nZVI$_{co}$ displayed similar SDC values upto $[S/Fe]_{particle}$ of 0.05, validating the hypothesis that amount of FeS associated with $Fe^0$ influenced the SDC. Increasing the $[S/Fe]_{particle}$ allowed for higher TCE transformation extents due to higher amounts of electrons being extracted from the nanoparticle via FeS.

Figure 10A:
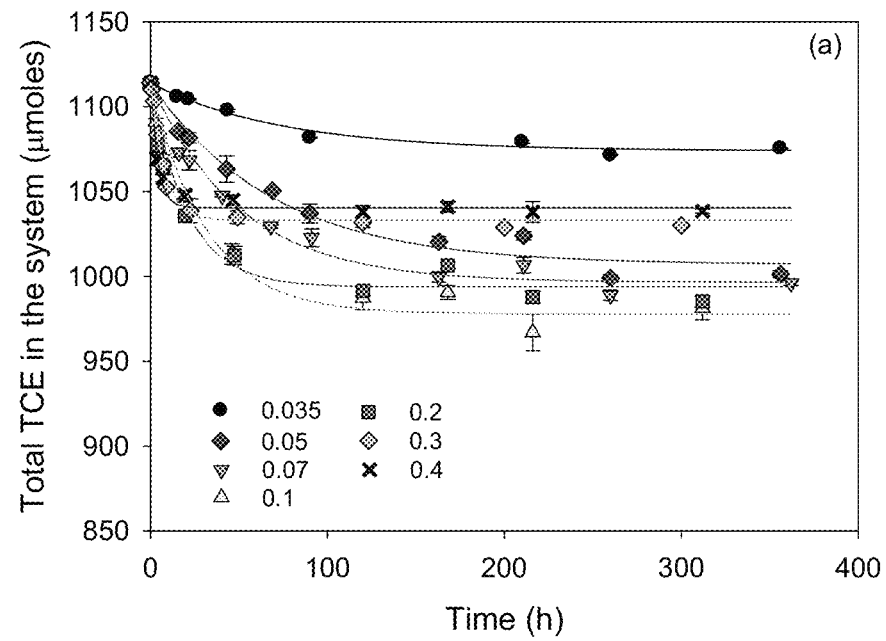
FIG. 10 represents a TCE degradation profile for in (a) S-nZVI$_{co}$, (b) a comparative nZVI, (c) nZVI and Pd-containing nZVI at different Pd contents and (d) represents the initial $Fe^0$ contents at different [S/Fe]$_{dosed}$.
Figure 10B:
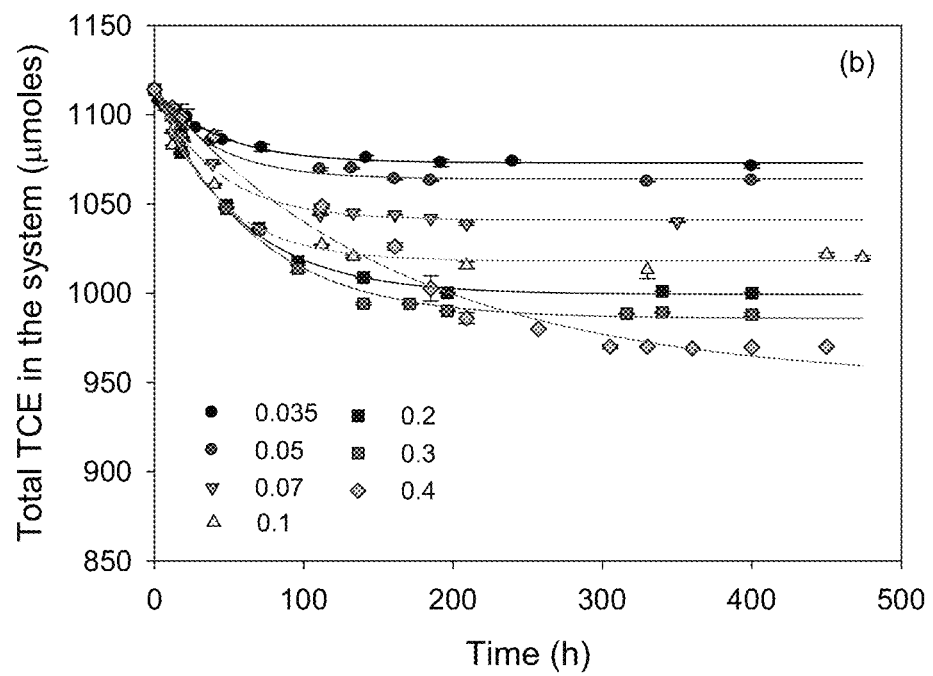
Figure 10C:
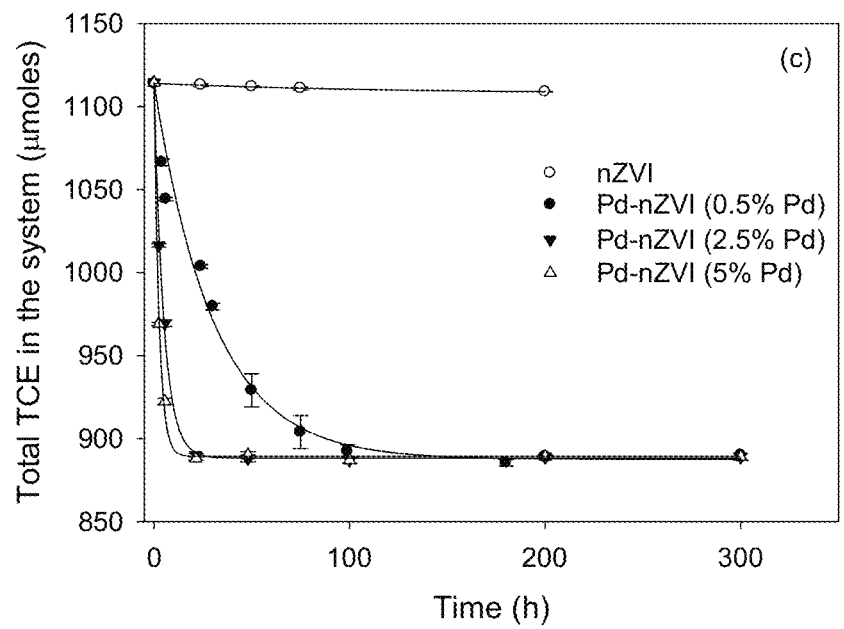
Figure 10D:
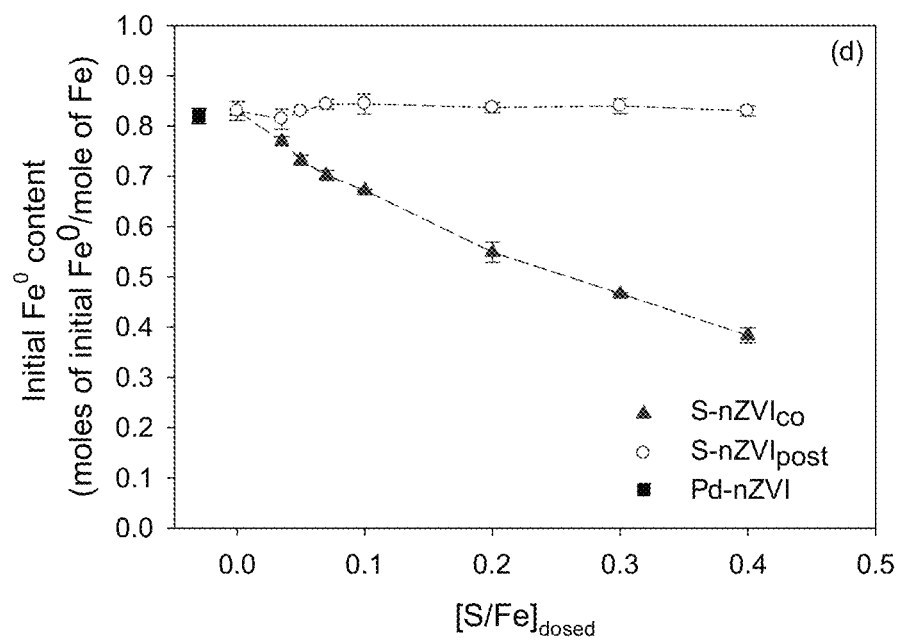

The difference in the amounts of sulfur in S-nZVI$_{co}$ and S-nZVI$_{post}$ can be attributed to the distribution pattern of FeS. As is seen in FIG. 1b, FeS structures are associated with the S-nZVI$_{post}$ particles, primarily on the outer surface. The availability of FeS deposition sites ($Fe^0$ and Fe-oxide sites) being limited to the outer surface of S-nZVI$_{post}$ likely caused the limited sulfur uptake (Fan et al., 2013, *Environmental science & technology*, 47(10): 5302-5310). In contrast, for S-nZVI$_{co}$ FeS precipitation occurs along with formation of $Fe^0$ during the nanoparticle nucleation and growth phase. This allows association of higher amounts of FeS with S-nZVI$_{co}$ through incorporation within the nanoparticles as well formation of FeS structures around the particles. It was observed that with increases in the $[S/Fe]_{dosed}$ from 0 to 0.4, the initial $Fe^0$ content (moles of initial $Fe^0$ per mole of Fe) for S-nZVI$_{co}$ decreased from 0.82 to 0.4 respectively (FIG. 10d and Table 2 below).

TABLE 2

$Fe^0$ content at different $[S/Fe]_{dosed}$ in the nanoparticle

| $[S/Fe]_{dosed}$ | $Fe^0$ content |
| --- | --- |
| 0.035 | 77% |
| 0.05 | 73% |
| 0.07 | 70% |
| 0.1 | 67% |
| 0.2 | 55% |
| 0.3 | 48% |
| 0.4 | 40% |

This is expected due to the stoichiometric consumption of $Fe^0$ by $HS^-$ during FeS formation. Interestingly, the initial $Fe^0$ content of S-nZVI$_{post}$ particles remained relatively unchanged. This could be a result of the small $[S/Fe]_{particle}$ achieved by S-nZVI$_{post}$ (FIG. 2b) as well as the replacement of only the surface Fe-oxides by FeS. Despite a lower $Fe^0$ content, S-nZVI$_{co}$ is much more reactive than S-nZVI$_{post}$. For instance, at $[S/Fe]_{dosed}$ of 0.4, S-nZVI$_{co}$ has an initial $Fe^0$ content of 0.4 compared to S-nZVI$_{post}$ which has 0.82. However S-nZVI$_{co}$ achieved an SDC of 0.46 compared to 0.28 of S-nZVI$_{post}$. This demonstrates that $Fe^0$ content alone does not determine TCE degradation capacity, highlighting the benefit of a rational particle design approach.

S-nZVI$_{co}$ has higher rates of TCE degradation than Pd-nZVI and S-nZVI$_{post}$. Along with quantifying the extents of TCE degradation, it was also evaluated the rates of degradation for each type of nanoparticle. The TCE degradation profile over time was best fitted with a pseudo first order rate law (FIGS. 10a and b) as shown in the following integrated rate equation.

$$M_t = M_e + (M_0 - M_e)e^{-k_{obs}t} \quad (2)$$

In Equation 2, $M_t$ is the moles of TCE in the reactor at any time t, $M_0$ is the initial moles of TCE in the reactor, $M_e$ is the moles of TCE in the reactor at the end of the degradation reaction, and $k_{obs}$ is the observed pseudo-first-order TCE degradation rate constant ($h^{-1}$). The observed rate constant was then normalized by the particle BET surface areas ($m^2/g$) and $Fe^0$ mass concentrations (g/L) to obtain $k_{sa}$ presented in FIG. 3.

Figure 11:
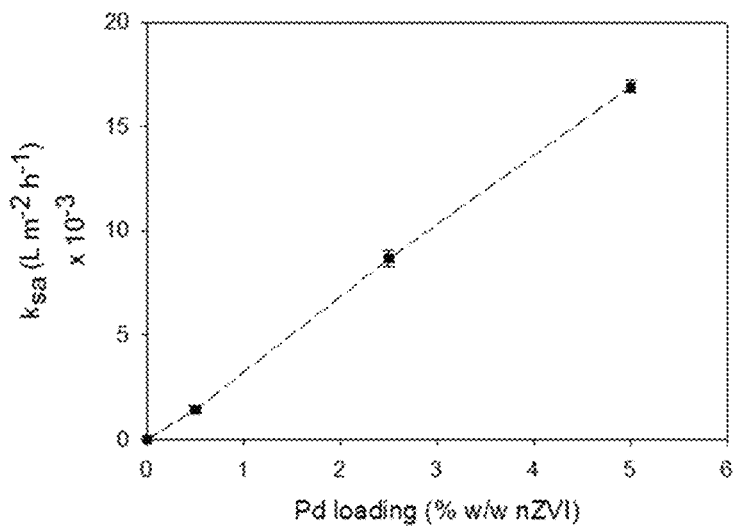
FIG. 11 is a surface area normalized pseudo first order TCE degradation rate constants under $Fe^0$ excess conditions for Pd-containing nZVI.

As seen in FIG. 3, the $k_{sa}$ for S-nZVI$_{co}$ showed a rapid increase from $0.61 \times 10^{-3}$ to $23.06 \times 10^{-3}$ L m$^{-2}$ h$^{-1}$ between [S/Fe]$_{dosed}$ of 0.035 and 0.4, respectively. The increase in rate constants can be attributed to the increasing association of FeS and Fe$^0$ with increasing [S/Fe]$_{dosed}$. The rapid rise in the $k_{sa}$ from 0.2 to 0.4 is likely related to the increase in the FeS structures embedded in and present around the particles (FIG. 1a) that substantially improve electron conduction to TCE molecules at the surface. The $k_{sa}$ for Pd-nZVI with 0.5 wt. % Pd in FIG. 3, was $1.43 \times 10^{-3}$ L m$^{-2}$ h$^{-1}$ which was comparable to degradation rates of S-nZVI$_{co}$ between [S/Fe]$_{dosed}$ of 0.05 and 0.1. By increasing the Pd content to 2.5% and 5%, a linear increase was observed in the $k_{sa}$ with it being $16 \times 10^{-3}$ L m$^{-2}$ h$^{-1}$ at 5 wt. % Pd (FIG. 11). This suggests that under Fe$^0$ limited conditions, the $k_{sa}$ was limited by the number of Pd sites (Xie et al., 2013, *Environmental science & technology*, 47(14): 7940-7948). Thus, in order to achieve rate constants comparable to S-nZVI$_{co}$ at [S/Fe]$_{dosed}$ greater than 0.1, higher loadings of Pd are needed on nZVI which can significantly add to the costs of remediation.

The $k_{sa}$ for S-nZVI$_{post}$ and S-nZVI$_{co}$ were similar between [S/Fe]$_{dosed}$ of 0.035 and 0.1. However between [S/Fe]$_{dosed}$ of 0.1 and 0.4, the $k_{sa}$ of S-nZVI$_{post}$ decreased from $1.03 \times 10^{-3}$ to $0.26 \times 10^{-3}$ L m$^{-2}$ h$^{-1}$. This decrease in degradation rates was likely due to increased oxide growth near the particle surface. Because the location of FeS is at the particle surface in S-nZVI$_{post}$, the growth of more oxides at the surface likely slows down the efficiency of electron conduction, thereby retarding the degradation kinetics. Additionally between [S/Fe]$_{dosed}$ of 0.1 and 0.4, a significant amount of HS$^-$ remained dissolved in the aqueous suspension (FIG. 2b), which may have also contributed to the slowing down of TCE degradation rate (Fan et al., 2013, *Environmental Science & Technology*, 47(10): 5302-5310).

Figure 12:
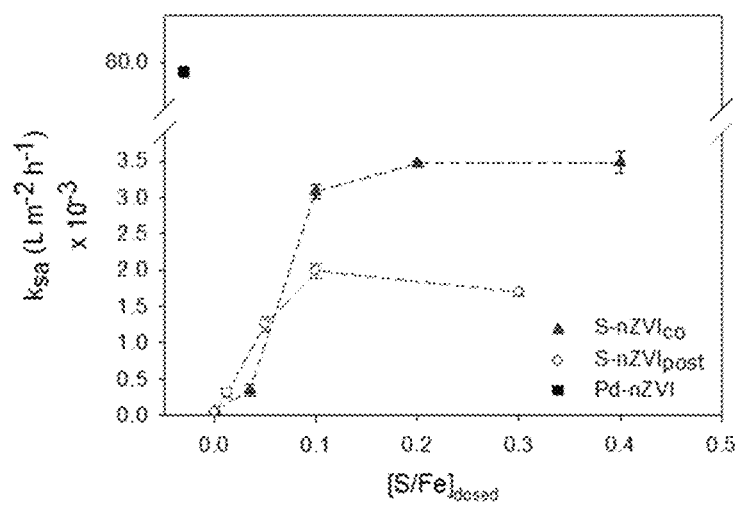
FIG. 12 is a surface area normalized pseudo first order TCE degradation rate constants under $Fe^0$ excess conditions for certain nZVI.

The performance of the nanoparticles under Fe$^0$ excess conditions were also evaluated. As seen in FIG. 12, the $k_{sa}$ values for S-nZVI$_{co}$ increased from $0.34 \times 10^{-3}$ L m$^{-2}$ h$^{-1}$ at [S/Fe]$_{dosed}$ of 0.035, to $3.46 \times 10^{-3}$ L m$^{-2}$ h$^{-1}$ at [S/Fe]$_{dosed}$ of 0.2 and did not change thereafter likely due to the attainment of optimal number of FeS binding sites for the limited mass of TCE employed S-nZVI$_{post}$ displayed an optimum $k_{sa}$ of $1.98 \times 10^{-3}$ L m$^{-2}$ h$^{-1}$ at [S/Fe]$_{dosed}$ of 0.1. Pd-nZVI (0.5 wt. % Pd) had a $k_{sa}$ of $79.61 \times 10^{-3}$ L m$^{-2}$ h$^{-1}$ which was 56 times higher than that under Fe$^0$ limited conditions. Under Fe$^0$ excess conditions, the rapid reaction kinetics of Pd-nZVI with water to produce hydrogen (shown in FIG. 4) likely resulted in rapid hydrogenation of TCE and high dechlorination rate.

An important observation from the reactivity studies under Fe$^0$ limited conditions was the absence of hydrogen generation during TCE degradation reactions, for S-nZVI$_{co}$, S-nZVI$_{post}$ and Pd-nZVI. Hydrogen is produced by the corrosion of Fe$^0$ in water and amendment of nZVI with Pd or S can influence its reactivity to water. Previous studies investigating the hydrogen generation rate of S-nZVI particles (synthesized using the two-step approach) reported the suppression of reaction rates with water (Rajajayavel et al., 2015, *Water research*, 78: 144-153; Han et al., 2016, *Environmental science & technology*, 50(23): 12992-13001; and Fan et al., 2016, *Environmental science & technology*, 50(17): 9558-9565.

Figure 13A:
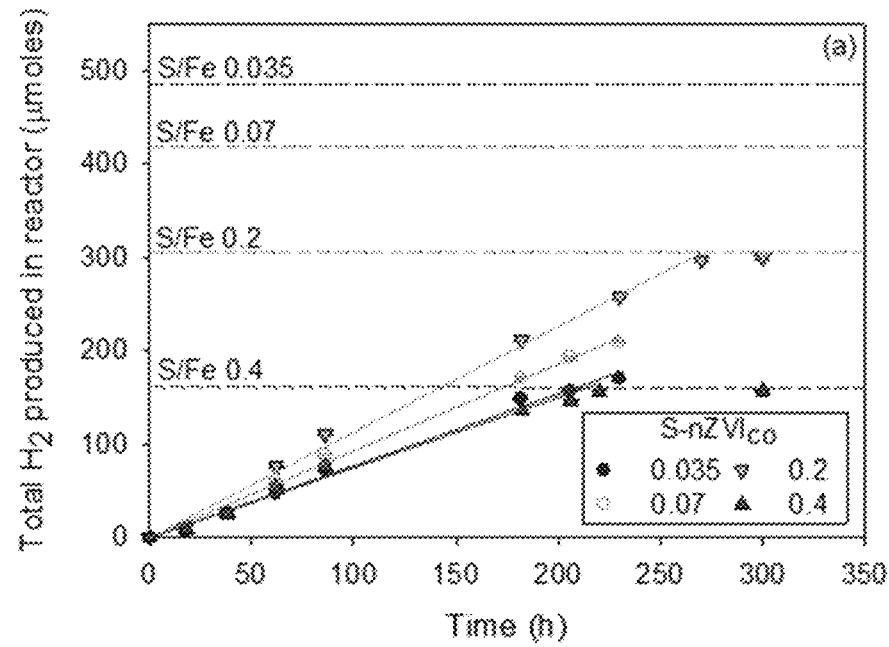
FIG. 13 represents the hydrogen evolution profile in the absence of TCE for (a) S-nZVI$_{co}$ (b) nZVI, Pd-nZVI and S-nZVI$_{post}$.
Figure 13B:
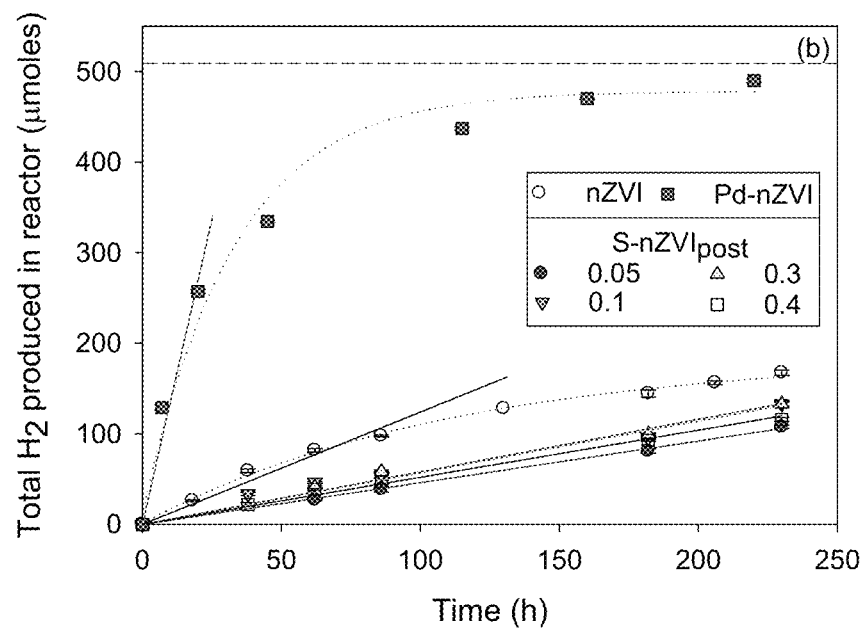

Therefore separate kinetic experiments were conducted with nZVI, Pd-nZVI, S-nZVI$_{co}$ and S-nZVI$_{post}$ to evaluate their hydrogen generation ability in the absence of TCE (FIG. 13). Solid lines in (a) and (b) represent the zero-order fits for the hydrogen evolution profiles (S-nZVI$_{co}$ zero-order fits: $r^2 > 0.98$). The dashed lines in (a) represent the stoichiometric maximum hydrogen evolution achievable at different dosed S/Fe ratios for S-nZVI$_{co}$. Due to the varying amounts of initial Fe$^0$ content in the particles at different [S/Fe]$_{dosed}$ (FIG. 10), the stoichiometrically maximum achievable hydrogen evolution by S-nZVI$_{co}$ were different. The dashed line in (b) represents the stoichiometric maximum hydrogen evolution achievable by nZVI, Pd-nZVI and S-nZVI$_{co}$. The stoichiometrically maximum $H_2$ that can be generated by nZVI, Pd-nZVI and S-nZVI$_{post}$ particles was similar due to the equivalent amounts of Fe$^0$ (FIG. 10) and is represented by the dashed line at 515 μmoles. The dotted lines in (b) represent the deviation from zero-order $H_2$ evolution kinetics for nZVI and Pd-nZVI particles.

As shown in FIG. 13, $H_2$ evolution profiles of S-nZVI$_{co}$ and S-nZVI$_{post}$ followed zero order kinetics. However, as observed, Pd-nZVI and nZVI showed deviations from the zero order kinetics after 24 h and 60 h respectively. Pd-nZVI particles generated large amounts of $H_2$ within 24 hrs and likely deviated from zero order kinetics due to rapid depletion of Fe$^0$ as it reached the stoichiometric maximum. In the case of nZVI particles, the deviation from zero order kinetics was likely due to the effect of progressively thickening surface oxides which slowed down electron conduction. Therefore, in order to draw a comparison with the zero-order kinetics displayed by S-nZVI$_{post}$ and S-nZVI$_{co}$, the initial zero-order rate constants was used for Pd-nZVI (estimated from time points up to 24 h) and nZVI (estimated from time points up to 60 h). Their surface area normalized rate constants ($k_{H_2}$) were computed by normalizing the observed rate constants with BET surface areas and Fe$^0$ mass concentrations and are presented in FIG. 4.

As seen in FIG. 4, the $k_{H_2}$ for nZVI was 0.054 μmoles L m$^{-2}$ h$^{-1}$ while at [S/Fe]$_{dosed}$ of 0.035, the $k_{H_2}$ for S-nZVI$_{co}$ was 0.035 μmoles L m$^{-2}$ h$^{-1}$. A possible explanation for the higher $k_{H_2}$ of nZVI compared to S-nZVI$_{co}$ is the higher affinity of Fe-oxides than FeS, to water. However by increasing the [S/Fe]$_{dosed}$, the number of electron conduction sites in S-nZVI$_{co}$ increase due to higher amounts of FeS, which increases the $k_{H_2}$ to 0.071 μmoles L m$^{-2}$ h$^{-1}$ at [S/Fe]$_{dosed}$ of 0.4. Similar to reactivity with TCE, S-nZVI$_{post}$ displayed a lower $k_{H_2}$ (0.019 to 0.023 μmoles L m$^{-2}$ h$^{-1}$) compared to S-nZVI$_{co}$. This was likely due to lower amounts of FeS (FIG. 2c) and lower accessibility of electrons due to the FeS distribution pattern (FIG. 1b).

The S-nZVI disclosed herein show reactivity with TCE comparable to Pd-nZVI under Fe$^0$ limited conditions. Fe$^0$ limited (TCE excess) conditions can be expected at source zones where TCE NAPL is present. Although the mechanism of TCE degradation facilitated by $Pd^0$ is different from FeS, the results provided herein highlight that in composite nanoparticles, structural attributes can play as significant a role in enhancing reactivity, as chemical composition. In scenarios where contaminant mass is low ($Fe^0$ excess), Pd-nZVI exhibits high TCE dechlorination rates. However Pd-nZVI also undergoes rapid reactions with water to produce hydrogen, which consumes $Fe^0$. This may add considerably to treatment costs in field operations wherein the poorly mixed subsurface conditions can result in rapid loss of Pd-nZVI reductive capacity through reactions with water without efficiently treating the contaminant. Conversely, S-nZVI$_{co}$ exhibits low reactivity to water and higher selectivity to TCE which may make it more suitable for field applications. They are also more reactive than S-nZVI$_{post}$.

Example I

Materials and Synthesis $FeSO_4 \cdot 7H_2O$ (99%), $NaBH_4$ (≥98.5%), $Na_2S$ (99%), palladium acetate (99%), chloroethenes (vinyl chloride and cis 1, 2- & trans 1, 2-dichloroethene) and hexenes (cis 3- & trans 3- ≥95%) were obtained from Sigma-Aldrich. Gas standards of ethane, ethene, methane (99%) and 1-, cis-, trans-butene (1000 ppm in $N_2$) were obtained from Scotty Specialty Gases. Acetylene (99%) was obtained from Praxair Inc. Methanol and 1-butanol (99%) were purchased from Fisher scientific. Water used in experiments was double deionized.

Bare nZVI particles were synthesized using a procedure described previously (Rajajayavel et al., 2015, *Water research*, 78: 144-153) with some modifications. Briefly, 1.3 M $NaBH_4$ was added drop-wise at 5 mL/min using a syringe pump to a continuously mixed aqueous solution of 0.3 M $FeSO_4 \cdot 7H_2O$ under anaerobic conditions, followed by mixing for 30 minutes. The resulting NZVI suspension was washed with methanol, dried under nitrogen, and stored in an anaerobic chamber.

Sulfidated nZVI prepared by co-precipitation of iron sulfides and $Fe^0$ in a one-step approach is referred to herein as S-nZVI$_{co}$, and is distinct from the two-step approach referred to herein as post sulfidation (S-nZVI$_{post}$) in which sulfidation occurs after nZVI formation.

In the co-precipitation approach, aqueous solutions of $NaBH_4$ (1.7 M) and $Na_2S$ (between 0.026 M to 0.64 M) were mixed together and then added drop-wise at 5 mL/min to a continuously mixed aqueous solution of 0.3 M $FeSO_4 \cdot 7H_2O$ under anaerobic conditions, followed by 30 minutes of mixing. The resulting particles termed as S-nZVI$_{co}$, were washed with methanol and dried in the anaerobic chamber. The sulfur incorporated into the particles was measured and were 0.035, 0.05, 0.07, 0.1, 0.2, 0.3 and 0.4 as mole fractions of S/Fe.

The S/Fe mole ratios of S-nZVI$_{co}$ served as the molar dosing ratios ([S/Fe]$_{dosed}$) in the post-sulfidation approach. S-nZVI$_{post}$ was prepared according to Rajajayavel et al. (2015, *Water research*, 78: 144-153) wherein, nZVI particles were first prepared separately using the nZVI synthesis method described above, and then sulfidated directly in the vials used for TCE reaction experiments. This was done by adding different doses of aqueous $Na_2S$ solutions to the nZVI suspensions equivalent to [S/Fe]$_{dosed}$, followed by sonication of the vials in a bath sonicator for 15 min. The uptake of sulfur by the particles was also measured.

An ethanolic solution of palladium acetate, at 1 wt. % of nZVI, was added directly to nZVI suspensions in TCE reaction vials and sonicated for 15 min. All the Pd added was deposited on the particles.

Example II

Reactivity Studies

TCE degradation experiments were carried out at room temperature in 60 mL vials crimp-sealed with butyl rubber septa and samples were prepared in the anaerobic chamber. 100 µL TCE was added to reaction vials containing a total aqueous volume of 24.9 mL and 40 mg of nanoparticles.

Upon addition of TCE, a small globule of NAPL was formed. This provided a constant saturated aqueous solution of TCE throughout the duration of the reactivity experiments and ensured that degradation rates and extents were not influenced by any mass transfer limitations.

Relatively small changes in the headspace TCE concentrations occurred in the reactors, due to the saturated TCE solution and stoichiometrically limited amounts of $Fe^0$ compared to TCE. Thus TCE disappearance was tracked by quantifying TCE degradation products with time and using a carbon mass balance approach as described in our previous study (Bhattacharjee et al., 2016, *Environmental science & technology*, 50(16): 8631-8639). Calibration standards were prepared by adding known quantities of the gas standard in the reactors set-up exactly like the reactivity systems.

The mass of sulfur deposited on nZVI particles was measured using an ICP-OES (PerkinElmer Optima 8300). The nanoparticles were separated from solution using centrifugation followed by magnetic separation and then the nanoparticles and supernatant were separately acid digested in aqua regia (3:1 $HCl:HNO_3$).

TCE degradation products were quantified periodically by injection of 300 µL reactor headspace into a gas chromatograph (GC-FID and GC-MS). Details on GC, X-ray photoelectron spectroscopy (XPS) and transmission electron microscopy coupled with energy dispersive spectroscopy (TEM-EDS) instrumentation have been provided previously (Bhattacharjee et al., 2016, *Environmental science & technology*, 50(16): 8631-8639). Prior to measurement with XPS, S-nZVI samples were dried in an anaerobic chamber. Before being analyzed with TEM, a drop of S-nZVI suspension was directly placed on copper TEM grids and excess water was removed using a tissue. $Fe^0$ content was measured using acid digestion protocol mentioned elsewhere (Liu et al., 2005, *Environmental science & technology*, 39(5): 1338-1345). The nanoparticles were acid digested in HCl and the liberated $H_2$ gas was measured using a GC-TCD.

While the present disclosure has been described in connection with specific embodiments thereof, it will be understood that it is capable of further modifications and this application is intended to cover any variations, uses, or adaptations, including such departures from the present disclosure as come within known or customary practice within the art and as may be applied to the essential features hereinbefore set forth, and as follows in the scope of the appended claims.

The invention claimed is:

1. A sulfidated nanoscale zerovalent iron (S-nZVI$_{co}$), wherein said S-nZVI$_{co}$ is a particle comprising a core comprising FeS and $Fe^0$ and a shell comprising FeS, wherein said FeS is bridging said core and said shell.

2. The sulfidated nanoscale zerovalent iron of claim 1, wherein said S-nZVI$_{co}$ particle comprises a Specific Degradation Capacity (SDC)=(moles of TCE degraded)/(moles of initial) $Fe^0$ greater than or equal to 0.3.

3. The sulfidated nanoscale zerovalent iron of claim 1, wherein said S-nZVI$_{co}$ particle has a ratio [S/Fe]$_{particle}$/[S/Fe]$_{dosed}$ of about 1.

4. The sulfidated nanoscale zerovalent iron of claim 1, wherein said S-nZVI$_{co}$ particle has a ratio [S/Fe]$_{particle}$/[S/Fe]$_{dosed}$ of about 0.9.

5. The sulfidated nanoscale zerovalent iron of claim 1, wherein said S-nZVI$_{co}$ particle has a ratio of moles of initial $Fe^0$/mole of Fe less than about 0.8.

6. The sulfidated nanoscale zerovalent iron of claim 1, wherein said S-nZVI$_{co}$ particle has a ratio of moles of initial $Fe^0$/mole of Fe of less than or equal to the $Fe^0$ content.

7. The sulfidated nanoscale zerovalent iron of claim 1, wherein said S-nZVI$_{co}$ has a [S/Fe]$_{dosed}$ ranging from 0.035 to 0.4.

8. The sulfidated nanoscale zerovalent iron of claim 1, wherein said S-nZVI$_{co}$ particle has a [S/Fe]$_{particle}$ ratio higher than zero.

9. The sulfidated nanoscale zerovalent iron of claim 1, wherein said S-nZVI$_{co}$ particle has a [S/Fe]$_{particle}$ ratio higher than about 0.01.

10. The sulfidated nanoscale zerovalent iron of claim 1, wherein said S-nZVI$_{co}$ particle has a [S/Fe]$_{particle}$ ratio of higher than about 0.03.

11. The sulfidated nanoscale zerovalent iron of claim 1, wherein said S-nZVI$_{co}$ particle has a [S/Fe]$_{particle}$ ratio of less than about 0.8.

12. The sulfidated nanoscale zerovalent iron of claim 1, wherein said S-nZVI$_{co}$ particle has a [S/Fe]$_{particle}$ ratio of less than about 0.4.

13. A method for reducing a concentration of a chlorinated organic compound in a contaminated medium comprising contacting said aqueous medium with an S-nZVI$_{co}$ particle as defined in claim 1.

14. The method of claim 13, wherein said contaminated medium is an aqueous medium or a soil.

15. The method of claim 14, wherein said aqueous medium is groundwater.

16. A process for preparing a sulfidated nanoscale zerovalent iron (S-nZVI$_{co}$) as defined in claim 1, comprising synthesizing said S-nZVI$_{co}$ in one step comprising mixing together a sulfide reagent capable of providing sulfur as a hydrosulfide species (HS−), a borohydride reducing agent and $FeSO_4$ in a single reactor under an oxygen-free atmosphere.

17. The process of claim 16, wherein the step of mixing comprises adding said sulfide reagent and said borohydride reducing agent together to said $FeSO_4$.

18. The process of claim 16, wherein at least one of said sulfide reagent, borohydride and $FeSO_4$ is in an aqueous medium.

19. The process of claim 16, wherein said sulfide reagent is $Na_2S$, said borohydride is $NaBH_4$, and said $FeSO_4$ is a hydrate of $FeSO_4$.

20. The process of claim 16, further comprising washing and drying said S-nZVI$_{co}$ under said oxygen-free atmosphere.

* * * * *